(12) United States Patent
Shiokawa et al.

(10) Patent No.: US 11,435,565 B2
(45) Date of Patent: Sep. 6, 2022

(54) PROJECTION SYSTEM AND PROJECTION-TYPE IMAGE DISPLAY APPARATUS

(71) Applicant: SEIKO EPSON CORPORATION, Tokyo (JP)

(72) Inventors: Koji Shiokawa, Azumino (JP); Toshihiko Sakai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 525 days.

(21) Appl. No.: 16/574,236

(22) Filed: Sep. 18, 2019

(65) Prior Publication Data
US 2020/0088977 A1    Mar. 19, 2020

(30) Foreign Application Priority Data

Sep. 19, 2018    (JP) .............................. JP2018-174993

(51) Int. Cl.
| | |
|---|---|
| G02B 15/14 | (2006.01) |
| H04N 9/31 | (2006.01) |
| G02B 13/18 | (2006.01) |
| G02B 15/20 | (2006.01) |
| G03B 21/14 | (2006.01) |

(52) U.S. Cl.
CPC ........... *G02B 15/146* (2019.08); *G02B 13/18* (2013.01); *G02B 15/20* (2013.01); *G03B 21/142* (2013.01); *H04N 9/3141* (2013.01); *H04N 9/3102* (2013.01)

(58) Field of Classification Search
CPC ...... G02B 15/146; G02B 13/18; G02B 15/20; G02B 13/16; G02B 15/1465; G02B 15/167; G03B 21/142; H04N 9/3141; H04N 9/3102
See application file for complete search history.

(56) References Cited

U.S. PATENT DOCUMENTS

| | | | |
|---|---|---|---|
| 2007/0285802 A1* | 12/2007 | Sugita | ................ G02B 15/1465 359/689 |
| 2015/0205082 A1 | 7/2015 | Shiokawa | |

FOREIGN PATENT DOCUMENTS

JP        2015-135392 A    7/2015

* cited by examiner

*Primary Examiner* — James C. Jones
(74) *Attorney, Agent, or Firm* — Dority & Manning, P.A.

(57) ABSTRACT

A projection system has a zooming function and is configured that light rays from a telecentric system enter. The projection system is formed of seven lens groups. The first and seventh lens groups are fixed when the projection magnification is changed, and the second, third, fourth, fifth, and the sixth lens groups move along the optical axis when the projection magnification is changed. The second lens group is formed of one positive lens. The third lens group is formed of one positive lens. The fourth lens group is formed of one or two positive lenses and one negative lens having the center of curvature located at the magnifying side. The fifth lens group is formed of one negative lens having a magnifying-side aspheric surface and a demagnifying-side aspheric surface with each of the surfaces having the center of curvature located at the demagnifying side.

18 Claims, 13 Drawing Sheets

PROJECTION SYSTEM AND PROJECTION-TYPE IMAGE DISPLAY APPARATUS

The present application is based on, and claims priority from JP Application Serial Number 2018-174993, filed Sep. 19, 2018, the disclosure of which is hereby incorporated by reference herein in its entirety.

BACKGROUND

1. Technical Field

The present disclosure relates to a projection system having a zooming function and a projection-type image display apparatus incorporating the projection system having a zooming function.

2. Related Art

JP-A-2015-135392 describes a projection system incorporated in a projection-type image display apparatus, such as a projector. The projection system described in JP-A-2015-135392 has a zooming function that changes the projection magnification.

A projection system having a zooming function has a relatively large number of lenses. For embodiment, the projection system described in JP-A-2015-135392 includes at least 14 lenses. The manufacturing cost of the projection system can be readily reduced if the number of lenses can be reduced with the optical performance of the projection system ensured.

SUMMARY

An aspect of the present disclosure relates to a projection system having a zooming function that changes projection magnification, the projection system so configured that light rays from a telecentric system enter a lens closest to a demagnifying side and a maximum half field angle at a wide-angle end of the projection system is greater than or equal to 25° but smaller than or equal to 40°. The projection lens includes a first lens group, a second lens group, a third lens group, a fourth lens group, a fifth lens group, a sixth lens group, and a seventh lens group sequentially from a magnifying side toward the demagnifying side. The first lens group and the seventh lens group are fixed when the projection magnification is changed. The second lens group, the third lens group, the fourth lens group, the fifth lens group, and the sixth lens group move along an optical axis when the projection magnification is changed. The second lens group is formed of one positive lens. The third lens group is formed of one positive lens. The fourth lens group is formed of one or two positive lenses and one negative lens, the negative lens having a surface facing the magnifying side and a surface facing the demagnifying side with each of the surfaces having a center of curvature located at the magnifying side. The fifth lens group is formed of one negative lens having an aspheric surface facing the magnifying side and an aspheric surface facing the demagnifying side with each of the surfaces having a center of curvature located at the demagnifying side. The projection system satisfies Conditional Expressions (1) to (8) below, $$1.2 < |f1/fw| < 1.5 \tag{1},$$

$$1.4 \leq ft/fw \leq 1.8 \tag{2},$$

$$1.4 \leq FNw \leq 1.8 \tag{3},$$

$$1.05 < FNt/FNw < 1.25 \tag{4},$$

$$1.5 < |f5/fw| < 3.5 \tag{5},$$

$$1.75 < nd2 < 2.0 \tag{6},$$

$$0.2 < nd42 - nd41 < 0.5 \tag{7}, \text{ and}$$

$$20 < v41 - v42 < 70 \tag{8},$$

where ω represents a maximum half field angle at the wide-angle end, fw represents a focal length of the entire optical system at the wide-angle end, ft represents a focal length of the entire optical system at the telescopic end, f1 represents a focal length of the first lens group, f5 represents a focal length of the fifth lens group, FNw represents FNO at the wide-angle end, FNt represents FNO at the telescopic end, nd2 represents a refractive index of the positive lens of the second lens group, nd41 and v41 represent a refractive index and an Abbe number of a positive lens closest to the magnifying side in the fourth lens group, respectively, nd2 represents a refractive index of the negative lens of the fourth lens group, and v42 is an Abbe number of the negative lens of the fourth lens group, and the projection system is formed of 13 lenses or fewer.

In the aspect of the present disclosure, the projection system may satisfy Conditional Expressions (9) and (10) below, $$5 < D2/t2 < 15 \tag{9}, \text{ and}$$

$$6 < D3/t3 < 15 \tag{10},$$

where D2 represents a diameter of a portion of the positive lens of the second lens group that is a portion where an edge thickness of the positive lens is 1 mm, t2 represents a center thickness of the positive lens of the second lens group, D3 represents a diameter of a portion of the positive lens of the third lens group that is a portion where an edge thickness of the positive lens is 1 mm, and t3 represents a center thickness of the positive lens of the third lens group.

In the aspect of the present disclosure, the projection system may satisfy Conditional Expressions (11) and (12) below, $$1.65 < nd5 < 1.85 \tag{11}, \text{ and}$$

$$0.53 < Pg5 < 0.61 \tag{12},$$

where nd5 represents a refractive index of the negative lens of the fifth lens group, and Pg5 represents a partial dispersion ratio between a g line and an F line dispersed by the negative lens of the fifth lens group.

In the aspect of the present disclosure, the sixth lens group may include one doublet, that the doublet may be formed of a negative lens and a positive lens sequentially from the magnifying side toward the demagnifying side, and the projection system may satisfy Conditional Expressions (13) and (14) below, $$0.2 < nd61 - nd62 < 0.5 \tag{13}, \text{ and}$$

$$30 < vd62 - vd61 < 70 \tag{14},$$

where nd61 represents a refractive index of the negative lens of the doublet at a d line, vd61 represents an Abbe number of the negative lens of the doublet, nd62 represents a refractive index of the positive lens of the doublet at the d line, and vd62 represents an Abbe number of the positive lens of the doublet.

In the aspect of the present disclosure, the projection system may satisfy Conditional Expressions (15) and (16) below, $$0<nd2-nd3<0.35 \quad (15), \text{ and}$$

$$|vd2-vd3|<30 \quad (16),$$

where nd2 represents a refractive index of the positive lens of the second lens group at a d line, vd2 represents an Abbe number of the positive lens of the second lens group, nd3 represents a refractive index of the positive lens of the third lens group at the d line, and vd3 represents an Abbe number of the positive lens of the third lens group.

In the aspect of the present disclosure, a first lens closest to the magnifying side in the first lens group may have an aspheric surface facing the magnifying side and an aspheric surface facing the demagnifying side, the aspheric surfaces each having a center of paraxial curvature located at the magnifying side, and orientation of an amount of sag may change at a point on each of the aspheric surfaces.

In the aspect of the present disclosure, the seventh lens group may be formed of one positive lens and satisfy Conditional Expression (17) below, $$PgF1>-0.0016\times vdF1+0.62 \quad (17)$$

where PgF1 represents a partial dispersion ratio between a g line and an F line dispersed by the positive lens of the seventh lens group, and vdF1 represents an Abbe number of the positive lens of the seventh lens group.

In the aspect of the present disclosure, the first lens group may include at least two negative lenses, and out of the negative lenses provided in the first lens group, a demagnifying-side negative lens closest to the demagnifying side may have a concave surface facing the magnifying side and a concave surface facing the demagnifying side and satisfies Conditional Expression (18) below, $$60<vd13<95 \quad (18)$$

where vd13 is an Abbe number of the demagnifying-side negative lens.

In the aspect of the present disclosure, the projection system may satisfy Conditional Expression (19) below, $$1.4 \leq BF/fw \leq 2.0 \quad (19)$$

where BF represents an air conversion length of a back focal length of the projection system at the wide-angle end.

A projection-type image display apparatus according to another aspect of the present disclosure includes the projection system described above and an image display device disposed at a demagnifying-side conjugate plane of the projection system.

DESCRIPTION OF EXEMPLARY EMBODIMENTS

Embodiments of a projection system and a projection-type image display apparatus including the projection system will be described below in detail with reference to the drawings.

Projection-Type Image Display Apparatus

Figure 1:
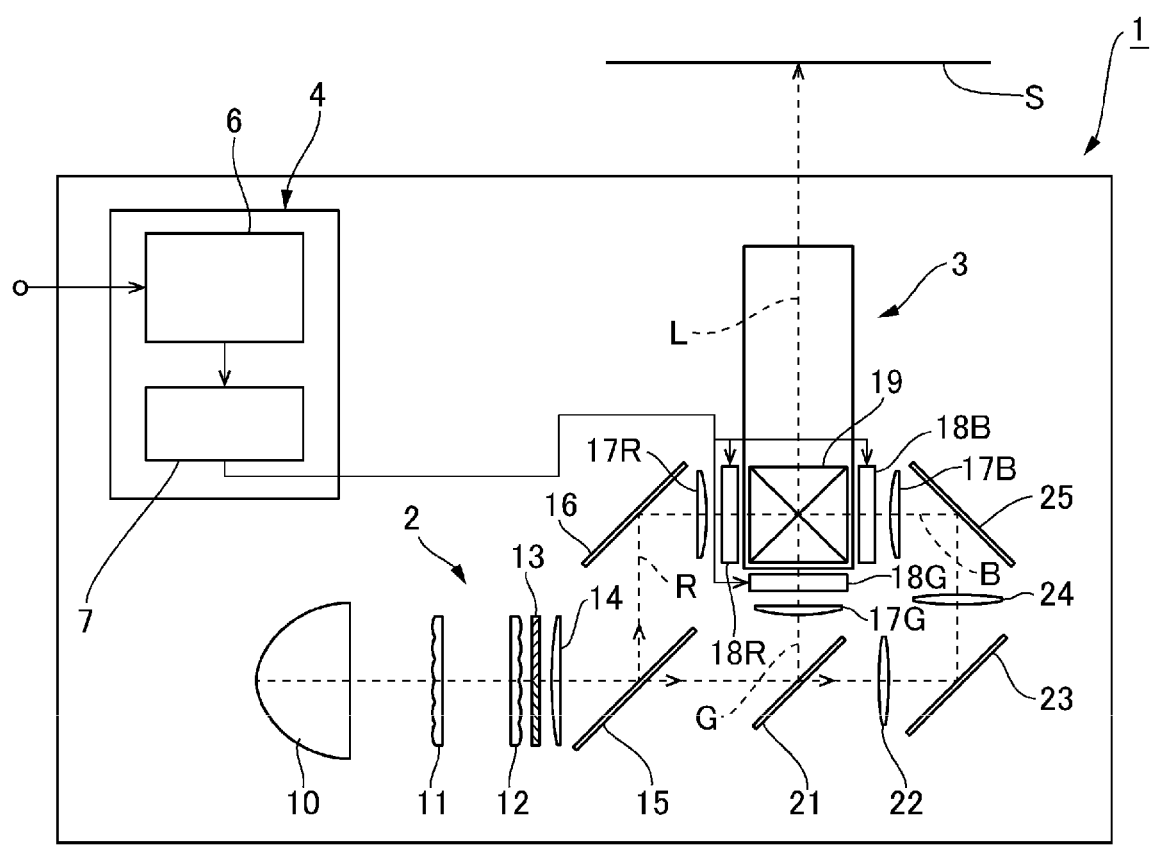
FIG. 1 shows a schematic configuration of a projection-type image display apparatus including a projection system.

FIG. 1 is a schematic configuration diagram of the projection-type image display apparatus including the projection system. A projection-type image display apparatus 1 includes an image formation section 2, which generates image light to be projected on a screen S, a projection system 3, which enlarges and projects the image light, and a controller 4, which controls the action of the image formation section 2, as shown in FIG. 1.

Image Light Generation System and Controller

The image formation section 2 includes alight source 10, a first optical integration lens 11, a second optical integration lens 12, a polarization converter 13, and a superimposing lens 14. The light source 10 is formed, for embodiment, of an ultrahigh-pressure mercury lamp or a solid-state light source. The first optical integration lens 11 and the second optical integration lens 12 each include a plurality of lens elements arranged in an array. The first optical integration lens 11 divides the light flux from the light source 10 into a plurality of light fluxes. The lens elements of the first optical integration lens 11 focus the light flux from the light source 10 in the vicinity of the lens elements of the second optical integration lens 12.

The polarization converter 13 converts the light from the second optical integration lens 12 into predetermined linearly polarized light. The superimposing lens 14 superimposes images of the lens elements of the first optical integration lens 11 on one another on a display area of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is an image display device. The liquid crystal panel 18R modulates the R light in accordance with an image signal to form red projection light.

The image formation section 2 further includes a second dichroic mirror 21, a field lens 17G, and the liquid crystal panel 18G. The second dichroic mirror 21 reflects the G light, which is part of the light rays via the first dichroic mirror 15, and transmits B light, which is part of the light rays via the first dichroic mirror 15. The G light reflected off the second dichroic mirror 21 passes through the field lens 17G and is incident on the liquid crystal panel 18G. The liquid crystal panel 18G modulates the G light in accordance with an image signal to form green projection light.

The image formation section 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is an image display device. The liquid crystal panel 18B modulates the B light in accordance with an image signal to form blue projection light.

The liquid crystal panels 18R, 18G, and 18B surround a cross dichroic prism 19 in such a way that the liquid crystal panels 18R, 18G, and 18B face three sides of the cross dichroic prism 19. The cross dichroic prism 19, which is a prism for light combination, combines the red projection light modulated by the liquid crystal panel 18R, the green projection light modulated by the liquid crystal panel 18G, and the blue projection light modulated by the liquid crystal panel 18B with one another into image light.

The cross dichroic prism 19 forms part of the projection system 3. The projection system 3 enlarges and projects the combined image light from the cross dichroic prism 19 on the screen S.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors on a color basis. The display driver 7 operates the liquid crystal panels 18R, 18G, and 18B based on the color projection image signals outputted from the image processor 6. The image processor 6 thus displays projection images corresponding to the image signals on the liquid crystal panels 18R, 18G, and 18B.

In the present embodiment, the liquid crystal panels 18R, 18G, and 18B are used as the image display devices, but not necessarily. The image display devices only in general each need to be a component that modulates light incident thereon in accordance with an image signal and may, for embodiment, be a micromirror-type light modulator. An embodiment of the micromirror-type light modulator can be a digital micromirror device (DMD). Further, the image display devices are each not limited to a transmissive liquid crystal panel and may be a reflective liquid crystal light valve and can, for embodiment, be a liquid-crystal-on-silicon (LCOS) device.

Projection System

The projection system 3 will next be described. At the wide-angle end, the projection system 3 enlarges images formed in a demagnifying-side conjugate plane (liquid crystal panels 18R, 18G, and 18B) and projects the enlarged images in a magnifying-side conjugate plane (screen S) with the magnification factor falling within a range of a maximum half field angle greater than or equal to 25° but smaller than or equal to 40°. In the following sections, Embodiments 1 to 3 will be described as configuration embodiments of the projection system 3 incorporated in the projection-type image display apparatus 1. In each of Embodiments, the maximum half field angle at the wide-angle end of the projection system falls within the range greater than or equal to 25° but smaller than or equal to 40°.

Embodiment 1

Figure 2:
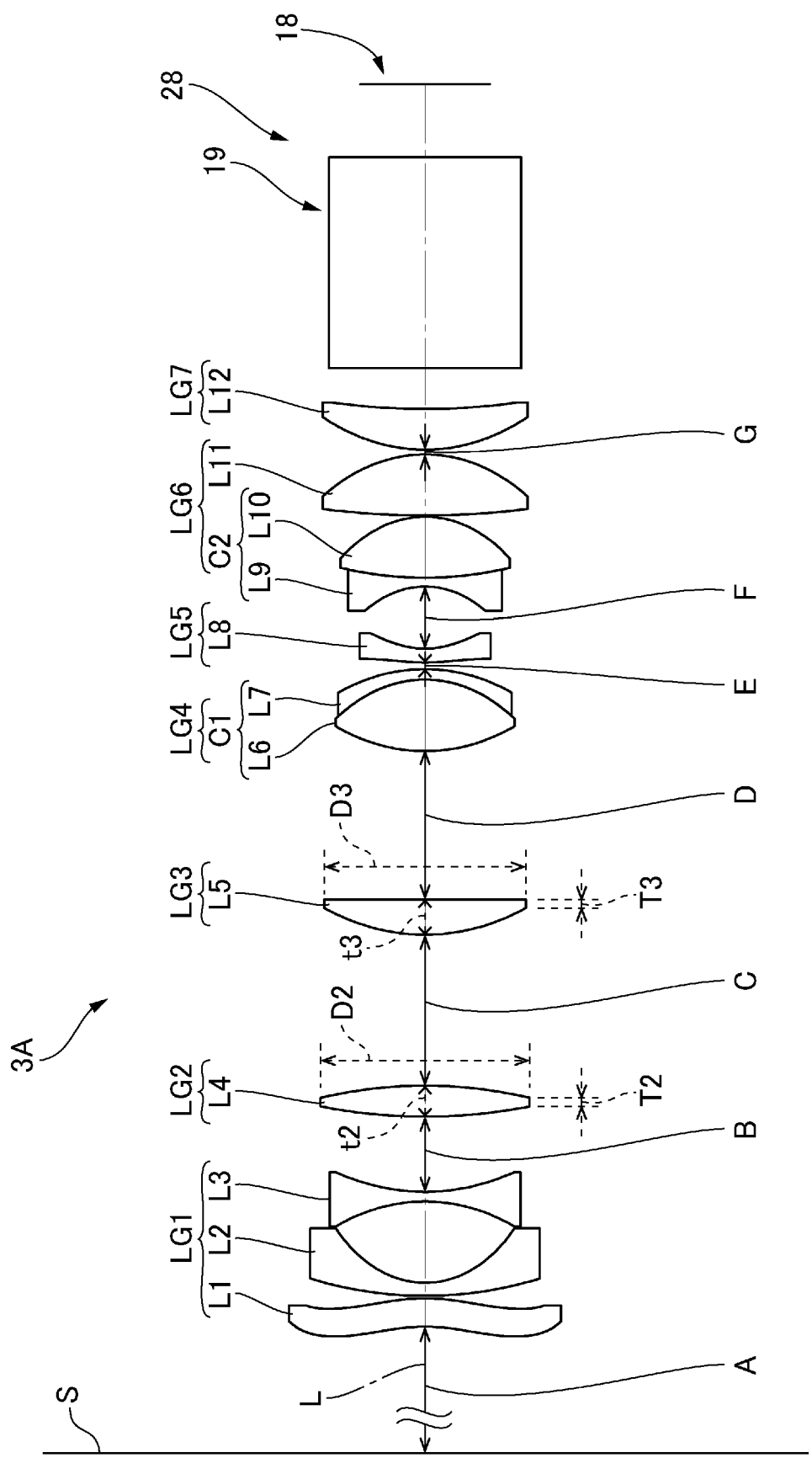
FIG. 2 is a lens configuration diagram of a projection system according to Embodiment 1 at a wide-angle end.
Figure 3:
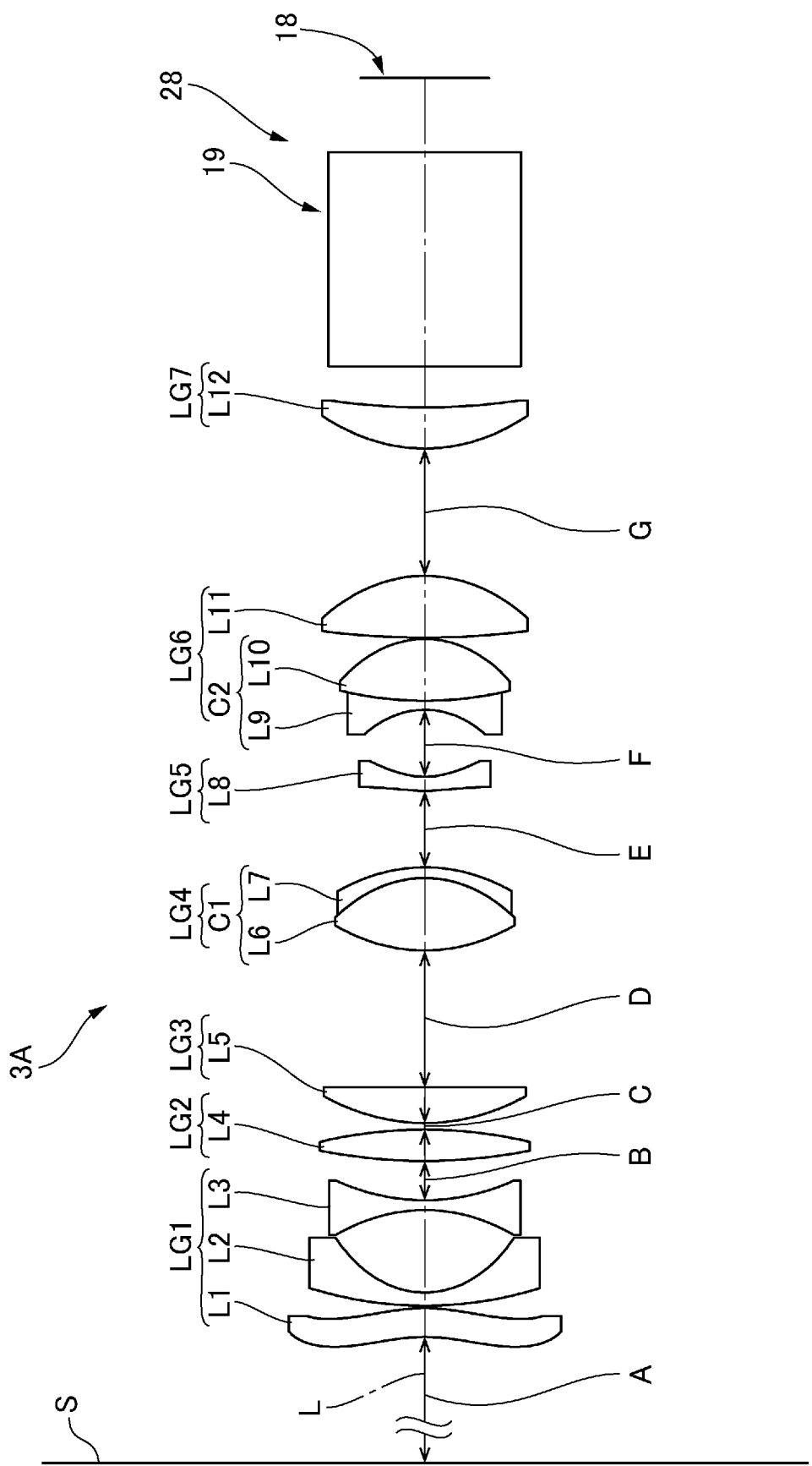
FIG. 3 is a lens configuration diagram of the projection system according to Embodiment 1 at a telescopic end.

FIGS. 2 and 3 are configuration diagrams of a projection system according to Embodiment 1. In FIG. 2, the lenses that form the projection system according to Embodiment 1 are disposed in positions in a wide-angle end arrangement that minimizes the focal length of the projection system. In FIG. 3, the lenses that form the projection system according to Embodiment 1 are disposed in positions in a telescopic end arrangement that maximizes the focal length of the projection system.

A projection system 3A according to the present embodiment is formed of 12 lenses L1 to L12, as shown in FIGS. 2 and 3. That is, the projection system 3A includes first lens L1 to a twelfth lens L12 (demagnifying-side lens) sequentially from the magnifying side where the screen S is located toward the demagnifying side where the liquid crystal panels 18 are located. The projection system 3A is formed of a first lens group LG1, a second lens group LG2, a third lens group LG3, a fourth lens group LG4, a fifth lens group LG5, a sixth lens group LG6, and a seventh lens group LG7 sequentially from the magnifying side toward the demagnifying side. The first lens group L1 and the fifth lens group LG5 each have negative power. The second lens group LG2, the third lens group LG3, the fourth lens group LG4, the sixth lens group LG6, and the seventh lens group LG7 each have positive power. The lens groups LG1 to LG7 of the projection system 3A have negative power, positive power, positive power, positive power, negative power, positive power, and positive power, respectively, sequentially from the magnifying side toward the demagnifying side. The lenses L1 to L12, which form the projection system 3A, are made, for example, of glass or resin.

The projection system 3A has a zooming function that changes the projection magnification. At the time of a change in magnification when the projection magnification is changed, the second lens group LG2, the third lens group LG3, the fourth lens group LG4, the fifth lens group LG5, and the sixth lens group LG6 move along an optical axis L. On the other hand, the first lens group LG1 and the seventh lens group LG7 are fixed and do not move at the time of a change in magnification. At the time of focusing, the first lens group LG1 is moved along the optical axis L.

The liquid crystal panels 18 are located in the demagnifying-side conjugate plane of the projection system 3A. The cross dichroic prism 19 is located between the seventh lens group LG7 and the liquid crystal panels 18. The liquid crystal panels 18 and the cross dichroic prism 19 form a telecentric system 28. Light rays from the telecentric system 28 therefore enter the twelfth lens L12, which is the lens closest to the demagnifying side. In other words, the optical path from the liquid crystal panels 18 to the twelfth lens L12 is telecentric or substantially telecentric with respect to the optical axis L.

The first lens group LG1 includes three lenses, the first lens L1, the second lens L2, and the third lens L3 (demagnifying-side negative lens) sequentially from the magnifying side toward the demagnifying side. The first lens group LG1 includes at least two negative lenses. In the present embodiment, the first lens L1, the second lens L2, and the third lens L3 are each a negative lens.

The first lens L1 is made of resin and has an aspheric magnifying-side surface and an aspheric demagnifying-side surface. The magnifying-side surface of the first lens L1 has the center of paraxial curvature located at the magnifying side, and the orientation of the amount of sag changes at a point on the surface. The demagnifying-side surface of the first lens L1 has the center of paraxial curvature located at the magnifying side, and the orientation of the amount of sag changes at a point on the surface. The first lens L1 has a larger effective diameter than those of the other lenses L2 to L12, which form the projection system 3A. The second lens L2 is a meniscus lens having a convex shape on the magnifying side. The third lens L3 has a concave magnifying-side surface and a concave demagnifying-side surface.

The second lens group LG2 is formed of the fourth lens L4. The fourth lens L4 is a positive lens. The third lens group LG3 is formed of the fifth lens L5. The fifth lens L5 is a positive lens. The fourth lens group LG4 is formed of the sixth lens L6 and the seventh lens L7. The sixth lens L6 is a positive lens. The seventh lens L7 is a negative lens. The magnifying-side surface of the seventh lens L7 has the center of curvature located at the magnifying side. The demagnifying-side surface of the seventh lens L7 has the center of curvature located at the magnifying side. The sixth lens L6 and the seventh lens L7 form a first doublet C1.

The fifth lens group LG5 is formed of the eighth lens L8. The eighth lens L8 is a negative lens. The eighth lens L8 has an aspheric magnifying-side surface and an aspheric demagnifying-side surface. The magnifying-side surface of the eighth lens L8 has the center of curvature located at the demagnifying side. The demagnifying-side surface of the eighth lens L8 has the center of curvature located at the demagnifying side. The eighth lens L8 has a smaller effective diameter than those of the other lenses L1 to L7 and L9 to L12, which form the projection system 3A. The sixth lens group LG6 is formed of the ninth lens L9, the tenth lens L10, and the eleventh lens L11. The ninth lens L9 is a negative lens. The tenth lens L10 is a positive lens. The eleventh lens L11 is a positive lens. The ninth lens L9 and the tenth lens L10 form a second doublet C2. The seventh lens group LG7 is formed of the twelfth lens L12. The twelfth lens L12 is a positive lens.

Data on the projection system 3A are shown below. It is assumed in the present embodiment that a reference wavelength λ is 587.56 nm. The foal length f, the back focal length (air conversion length) BF, and the effective image diameter are each expressed in millimeters. FNO represents the F number.

|  | Wide-angle end | Telescopic end |
| --- | --- | --- |
| f (focal length) | 18.21 | 29.09 |
| FNO | 1.54 | 1.78 |
| BF (in air) | 31.14 | 31.14 |
| Effective image diameter | φ22.00 | φ22.00 |
| ω (half field angle) | 31.5° | 20.9° |

The lens data on the lenses L1 to L12, which form the projection system 3A, are shown below. The field of "Lens" shows reference characters with which the lenses are labeled. The surfaces of the lenses are numbered sequentially from the demagnifying side toward the magnifying side. A surface having a surface number with * is an aspheric surface. The surface number S0 represents the screen S, which is the magnifying-side conjugate plane. The surface numbers S23 and S24 represent the magnifying-side surface and the demagnifying-side surface of an inserted object that is an optical member disposed in the optical path between the image display devices (liquid crystal panels 18R, 18G, and 18B) and a surface of the twelfth lens L12 that is the surface having the surface number S22 with the optical member converted into a planar glass plate made of the same material as that of the optical member. The optical member disposed in the optical path between the image display devices (liquid crystal panels 18R, 18G, and 18B) and a surface of the twelfth lens L12 that is the surface having the surface number S22 is, for embodiment, the cross dichroic prism 19. Reference character R represents a radius of curvature in millimeters. Reference character d represents an on-axis inter-surface spacing in millimeters. Reference character nd represents a refractive index. Reference character vd represents an Abbe number. An on-axis inter-surface spacing A is the distance between the screen S and the first lens group LG1. An on-axis inter-surface spacing B is the distance between the first lens group LG1 and the second lens group LG2. An on-axis inter-surface spacing C is the distance between the second lens group LG2 and the third lens group LG3. An on-axis inter-surface spacing D is the distance between the third lens group LG3 and the fourth lens group LG4. An on-axis inter-surface spacing E is the distance between the fourth lens group LG4 and the fifth lens group LG5. An on-axis inter-surface spacing F is the distance between the fifth lens group LG5 and the sixth lens group LG6. An on-axis inter-surface spacing G is the distance between the sixth lens group LG6 and the seventh lens group LG7. The on-axis inter-surface spacings B to G each change at the time of a change in magnification.

| Lens | Surface number | R | d | nd | vd |
| --- | --- | --- | --- | --- | --- |
|  | S0 | INFINITY | A |  |  |
| L1 | S1* | −41.540 | 3.500 | 1.53110 | 55.91 |
|  | S2* | −42.420 | 0.300 |  |  |
| L2 | S3 | 93.650 | 1.600 | 1.48749 | 70.24 |
|  | S4 | 21.120 | 10.012 |  |  |
| L3 | S5 | −40.300 | 1.200 | 1.49700 | 81.55 |
|  | S6 | 50.680 | B |  |  |
| L4 | S7 | 132.100 | 3.800 | 1.83400 | 37.16 |
|  | S8 | −110.340 | C |  |  |
| L5 | S9 | 48.078 | 4.330 | 1.69350 | 53.21 |
|  | S10 | INFINITY | D |  |  |
| L6 | S11 | 40.640 | 8.800 | 1.48749 | 70.24 |
| L7 | S12 | −27.260 | 1.300 | 1.83400 | 37.16 |
|  | S13 | −40.200 | E |  |  |
| L8 | S14* | 46.540 | 1.700 | 1.68948 | 31.02 |
|  | S15* | 19.130 | F |  |  |
| L9 | S16 | −19.700 | 1.100 | 1.80610 | 33.27 |
| L10 | S17 | 87.900 | 7.500 | 1.48749 | 70.24 |
|  | S18 | −23.400 | 0.170 |  |  |
| L11 | S19 | 198.270 | 7.500 | 1.69350 | 53.21 |
|  | S20 | −33.060 | G |  |  |
| L12 | S21 | 41.200 | 5.000 | 1.74320 | 49.34 |
|  | S22 | 159.700 | 5.000 |  |  |
|  | S23 | INFINITY | 26 | 1.51680 | 64.2 |
|  | S24 | INFINITY | 9 |  |  |

Aspheric coefficients of the aspheric surfaces of the first lens L1 that are labeled with the surface numbers S1 and S2 are shown below. Reference character K represents a Conic constant.

| | Surface number | |
|---|---|---|
| | S1 | S2 |
| Radius of curvature in direction Y | −41.54 | −42.42 |
| K | −8.418 | 1.815 |
| Fourth-order coefficient | 3.140800E−05 | 4.473510E−05 |
| Sixth-order coefficient | −6.782740E−08 | −7.597780E−08 |
| Eighth-order coefficient | 1.163250E−10 | 1.044490E−10 |
| Tenth-order coefficient | −9.774940E−14 | 2.302250E−14 |
| Twelfth-order coefficient | 2.329080E−17 | −1.879378E−16 |
| Fourteenth-order coefficient | 4.630670E−20 | 2.314668E−19 |

The amounts of sag of the surfaces of the first lens L1 that are labeled with the surface numbers S1 and S2 are shown below. An effective height, the sag, and the amount of change are each expressed in millimeters.

| | Amount of sag on surface S1 | | Amount of sag on surface S2 | |
|---|---|---|---|---|
| Effective height | Sag | Amount of change | Sag | Amount of change |
| 0 | 0.000 | — | 0.000 | — |
| 1 | −0.012 | −0.012 | −0.012 | −0.012 |
| 2 | −0.047 | −0.035 | −0.047 | −0.035 |
| 3 | −0.105 | −0.057 | −0.103 | −0.056 |
| 4 | −0.182 | −0.077 | −0.179 | −0.076 |
| 5 | −0.275 | −0.093 | −0.271 | −0.092 |
| 6 | −0.380 | −0.105 | −0.376 | −0.105 |
| 7 | −0.494 | −0.114 | −0.490 | −0.114 |
| 8 | −0.611 | −0.117 | −0.609 | −0.119 |
| 9 | −0.728 | −0.117 | −0.729 | −0.120 |
| 10 | −0.839 | −0.112 | −0.847 | −0.117 |
| 11 | −0.942 | −0.103 | −0.958 | −0.111 |
| 12 | −1.033 | −0.090 | −1.060 | −0.102 |
| 13 | −1.106 | −0.074 | −1.149 | −0.089 |
| 14 | −1.160 | −0.054 | −1.222 | −0.073 |
| 15 | −1.191 | −0.030 | −1.276 | −0.054 |
| 16 | −1.194 | −0.003 | −1.307 | −0.031 |
| 17 | −1.164 | 0.030 | −1.308 | −0.002 |
| 18 | −1.095 | 0.069 | −1.272 | 0.036 |
| 19 | −0.979 | 0.116 | −1.188 | 0.085 |
| 20 | −0.802 | 0.176 | −1.036 | 0.152 |
| 21 | −0.548 | 0.255 | — | — |
| 22 | −0.187 | 0.361 | — | — |

Aspheric coefficients of the aspheric surfaces of the eighth lens L8 that are labeled with the surface numbers S14 and S15 are shown below. Reference character K represents the Conic constant.

| | Surface number | |
|---|---|---|
| | S14 | S15 |
| Radius of curvature in direction Y | 46.54 | 19.13 |
| K | 0 | 0 |
| Fourth-order coefficient | −1.11723E−04 | −1.22865E−04 |
| Sixth-order coefficient | 7.94284E−07 | 8.72687E−07 |
| Eighth-order coefficient | −4.14253E−09 | −4.37410E−09 |
| Tenth-order coefficient | 1.05108E−11 | 2.55171E−12 |
| Twelfth-order coefficient | −4.04307E−15 | 7.58570E−14 |
| Fourteenth-order coefficient | | −2.30035E−16 |

The values of the on-axis inter-surface spacings A to G at the wide-angle end and the telescopic end are shown below.

| | Wide-angle end | Telescopic end |
|---|---|---|
| A | 1800 | 1800 |
| B | 9.255 | 4.778 |
| C | 18.599 | 0.8 |
| D | 18.257 | 16.63 |
| E | 0.812 | 9.309 |
| F | 7.592 | 8.131 |
| G | 0.6 | 15.467 |

In the projection system 3A, ω=31.5° is achieved, where ω represents the maximum half field angle at the wide-angle end.

The projection system 3A satisfies Conditional Expression (1) below, $$1.2 < |f1/fw| < 1.5 \quad (1)$$

where fw represents the focal length of the entire optical system at the wide-angle end, and f1 represents the focal length of the first lens group LG1.

In the present embodiment, f1=−22.17 and fw=18.21. Therefore, |f1/fw|=1.22 is achieved. In the present embodiment, in which Conditional Expression (1) is satisfied, the back focal length can be ensured with the optical performance of the projection system 3A maintained. That is, when the value of Conditional Expression (1) is smaller than or equal to the lower limit, it is difficult to ensure the back focal length. When the value of Conditional Expression (1) is greater than or equal to the upper limit, the diameter of each of the lenses in the second lens group LG2 and the third lens group LG3 increases, and the aberration correction burden on each of the second lens group LG2 and the third lens group LG3 increases, resulting in deterioration of the optical performance of the projection system 3A.

The projection system 3A further satisfies Conditional Expression (2) below, $$1.4 \leq ft/fw \leq 1.8 \quad (2)$$

where fw represents the focal length of the entire optical system at the wide-angle end, and ft represents the focal length of the entire optical system at the telescopic end.

In the present embodiment, ft=29.10 and fw=18.21. Therefore, ft/fw=1.6 is achieved. In the present embodiment, in which Conditional Expression (2) is satisfied, predetermined magnification and desired optical performance can be provided. That is, when the value of Conditional Expression (2) is smaller than the lower limit, the magnification decreases. When the value of Conditional Expression (2) is greater than the upper limit, the optical performance deteriorates.

The projection system 3A then satisfies Conditional Expressions (3) and (4) below, $$1.4 \leq FNw \leq 1.8 \quad (3)$$

$$1.05 < FNt/FNw < 1.25 \quad (4)$$

where FNw represents FNO at the wide-angle end, and FNt represents FNO at the telescopic end.

In the present embodiment, FNw=1.54 and FNt=1.78. In the present embodiment, Conditional Expression (3) is therefore satisfied, whereby predetermined brightness and desired optical performance can be provided. That is, when the value of Conditional Expression (3) is smaller than or equal to the lower limit, the optical performance of the projection system 3A deteriorates. When the value of Conditional Expression (3) is greater than the upper limit, the brightness achieved by the projection system 3A decreases. Further, in the present embodiment, in which FNt/

FNw=1.16, which satisfies Conditional Expression (4), large variation in f number at the time of a change in magnification can be suppressed. In other words, large variation in brightness achieved by the projection system 3A due to a change in magnification can be suppressed.

The projection system 3A satisfies Conditional Expression (5) below, $$1.5<|f5/fw|<3.5 \qquad (5)$$

where f5 represents the focal length of the fifth lens group LG5 (eighth lens L8), and fw represents the focal length of the entire optical system at the wide-angle end.

In the present embodiment, f5=−48.33 and fw=18.21. Therefore, |f5/fw|=2.65 is achieved. In the present embodiment, in which Conditional Expression (5) is satisfied, comma and field curvature can be corrected. That is, when the value of Conditional Expression (5) is smaller than or equal to the lower limit, it is difficult to suppress occurrence of comma. When the value of Conditional Expression (5) is greater than or equal to the upper limit, it is difficult to suppress occurrence of field curvature.

The projection system 3A further satisfies Conditional Expression (6) below, $$1.75<nd2<2.0 \qquad (6)$$

where nd2 represents the refractive index of the positive lens (fourth lens L4) of the second lens group LG2.

In the present embodiment, nd2=1.83400. In the present embodiment, when the refractive index of the second lens group LG2 (fourth lens L4) is specified at a relatively large value in accordance with Conditional Expression (6), the first lens group LG1 can capture an appropriate amount of light. An increase in the size of each of the lenses L1 to L3, which form the first lens group LG1, can thus be suppressed. The manufacturing cost of each of the lenses L1 to L3 of the first lens group LG1 can therefore be suppressed. Further, specifying the refractive index of the second lens group LG2 (fourth lens L4) at a relatively large value allows suppression of occurrence of field curvature.

The projection system 3A satisfies Conditional Expressions (7) and (8) below, $$0.2<nd42-nd41<0.5 \qquad (7)$$

$$20<v41-v42<70 \qquad (8)$$

where nd41 and v41 represent the refractive index and the Abbe number of a positive lens closest to the magnifying side in the fourth lens group LG4 (sixth lens L6, which is magnifying-side lens of first doublet C1), respectively, and nd42 and v42 represent the refractive index and the Abbe number of the negative lens in the fourth lens group LG4 (seventh lens L7, which is demagnifying-side lens of first doublet C1), respectively.

In the present embodiment, nd41=1.48749 and nd42=1.83400. Therefore, nd42−nd41=0.347 is achieved. Further, in the present embodiment, vd41=70.24 and vd42=37.16. Therefore, v41−v42=33.08 is achieved. In the present embodiment, when the fourth lens group LG4 is moved to the telescopic end, off-axis light rays travel along paths high above the optical axis, and the spherical aberration is likely to increase. To solve the problem, the projection system 3A, which satisfies Conditional Expression (7), can suppress an increase in spherical aberration at the telescopic end. Moving the fourth lens group LG4 at the time of a change in the magnification increases variation in axial chromatic aberration. To solve the problem, the projection system 3A, which satisfies Conditional Expression (8), can suppress the variation in axial chromatic aberration.

The projection system 3A then satisfies Conditional Expressions (9) and (10) below, $$5<D2/t2<15 \qquad (9)$$

$$6<D3/t3<15 \qquad (10)$$

In Conditional Expression (9), D2 represents the diameter of a portion of the positive lens (fourth lens L4) of the second lens group LG2 that is the portion where an edge thickness T2 of the fourth lens L4 is 1 mm, and t2 represents the center thickness of the positive lens (fourth lens L4) of the second lens group LG2. In Conditional Expression (10), D3 represents the diameter of a portion of the positive lens (fifth lens L5) of the third lens group LG3 that is the portion where an edge thickness T3 of the fifth lens L5 is 1 mm, and t3 represents the center thickness of the positive lens (fifth lens L5) of the third lens group LG3.

In the present embodiment, D2=36.3 and t2=3.8. Therefore, D2/t2=9.6 is achieved. Further, in the present embodiment, D3=35.15 and t3=4.33. Therefore, D3/t3=8.1 is achieved. In the present embodiment, in which Conditional Expression (9) is satisfied, a situation in which the fourth lens L4 has a large thickness can be avoided. Further, in the present embodiment, in which Conditional Expression (10) is satisfied, a situation in which the fifth lens L5 has a large thickness can be avoided. In the present embodiment, the fourth lens L4 and the fifth lens L5 are made of glass. Therefore, when the fourth lens L4 and the fifth lens L5 each have a small thickness, the manufacturing cost of the lenses is likely to be suppressed.

The projection system 3A satisfies Conditional Expression (11) below, $$1.65<nd5<1.85 \qquad (11)$$

where nd5 represents the refractive index of the negative lens (eighth lens L8) of the fifth lens group LG5.

In the present embodiment, nd5=1.68948. In the present embodiment, in which Conditional Expression (11) is satisfied, occurrence of field curvature can be suppressed. Further, an increase in cost required to manufacture the eighth lens L8 made of glass can be suppressed. That is, when the value of Conditional Expression (11) is smaller than or equal to the lower limit, it is difficult to correct the field curvature. When the value of Conditional Expression (11) is greater than or equal to the upper limit, the refractive index increases, and the cost required to manufacture the eighth lens L8 made of glass therefore increases.

Further, the projection system 3A satisfies Conditional Expression (12) below, $$0.53<Pg5<0.61 \qquad (12)$$

where Pg5 represents the partial dispersion ratio between the g line and the F line dispersed by the negative lens (eighth lens L8) of the fifth lens group LG5.

In the present embodiment, Pg5=0.599. In the present embodiment, in which Conditional Expression (12) is satisfied, occurrence of chromatic aberration of magnification can be suppressed. That is, when Conditional Expression (12) is not satisfied, it is difficult to correct the chromatic aberration of magnification at the wide-angle end.

The projection system 3A then satisfies Conditional Expression (13) below, $$0.2<nd61-nd62<0.5 \qquad (13)$$

where nd61 represents the refractive index of the magnifying-side negative lens (ninth lens L9) of the second doublet C2, which forms the sixth lens group LG6, at the d line, and nd62 represents the refractive index of the demagnifying-side positive lens (tenth lens L10) of the second doublet C2 at the d line.

In the present embodiment, nd61=1.80610 and nd62=1.48749. Therefore, nd61−nd62=0.32 is achieved. In the present embodiment, in which Conditional Expression (13) is satisfied, occurrence of field curvature can be suppressed. That is, when Conditional Expression (13) is not satisfied, it is difficult to correct the field curvature at the wide-angle end.

The projection system 3A satisfies Conditional Expression (14) below, $$30 < vd62 - vd61 < 70 \quad (14)$$

where vd61 represents the Abbe number of the magnifying-side negative lens (ninth lens L9) of the second doublet C2, which forms the sixth lens group LG6, and vd62 represents the Abbe number of the demagnifying-side positive lens (tenth lens L10) of the second doublet C2.

In the present embodiment, vd61=33.27 and vd62=70.24. Therefore, vd62−vd61=36.97 is achieved. In the present embodiment, in which Conditional Expression (14) is satisfied, occurrence of chromatic aberration of magnification can be suppressed. That is, when Conditional Expression (14) is not satisfied, it is difficult to correct the chromatic aberration of magnification at the wide-angle end.

The projection system 3A satisfies Conditional Expression (15) below, $$0 < nd2 - nd3 < 0.35 \quad (15)$$

where nd2 represents the refractive index of the positive lens (fourth lens L4) of the second lens group LG2 at the d line, and nd3 represents the refractive index of the positive lens (fifth lens L5) of the third lens group LG3 at the d line.

In the present embodiment, nd2=1.83400 and nd3=1.69350. Therefore, nd2−nd3=0.14 is achieved. In the present embodiment, in which Conditional Expression (15) is satisfied, the relationship between the material of the second lens group LG2 and the material of the third lens group LG3 is specified. Field curvature that occurs when the magnification is changed can therefore be suppressed. Variation in the field curvature at the time of a change in magnification can further be suppressed. That is, when Conditional Expression (15) is not satisfied, it is difficult to correct the field curvature.

The projection system 3A further satisfies Conditional Expression (16) below, $$|vd2 - vd3| < 30 \quad (16)$$

where vd2 represents the Abbe number of the positive lens (fourth lens L4) of the second lens group LG2, and vd3 represents the Abbe number of the positive lens (fifth lens L5) of the third lens group LG3.

In the present embodiment, vd2=37.16 and vd3=53.21. Therefore, |vd2−vd3|=16.05 is achieved. In the present embodiment, in which Conditional Expression (16) is satisfied, the relationship between the material of the second lens group LG2 and the material of the third lens group LG3 is specified. Variation in the chromatic aberration of magnification at the time of a change in magnification can therefore be suppressed. That is, when Conditional Expression (16) is not satisfied, it is difficult to suppress the variation of the chromatic aberration of magnification at the time of a change in magnification.

The first lens L1 of the projection system 3A has an aspheric magnifying-side surface and an aspheric demagnifying-side surface, and the surfaces having the surface numbers S1 and S2 each have the center of paraxial curvature located at the magnifying side. Further, the orientation of the amount of sag changes at a point on each of the surfaces having the surface numbers S1 and S2 of the first lens L1. That is, the amount of change in sag is reversed at a point on each of the surfaces having the surface numbers S1 and S2. The f number can therefore be reduced to a small number. That is, the brightness achieved by the projection system 3A can be readily increased. Further, distortion of the peripheral light and the field curvature can be readily corrected.

The seventh lens group LG7 (twelfth lens L12) is a positive lens and satisfies Conditional Expression (17) below, $$PgF1 > -0.0016 \times vdF1 + 0.62 \quad (17)$$

where PgF1 represents the partial dispersion ratio between the g line and the F line dispersed by the seventh lens group LG7 (twelfth lens L12), and vdF1 represents the Abbe number thereof.

In the present embodiment, PgF1=0.553 and vdF1=49.34. Therefore, −0.0016×vdF1+0.62=0.541 is achieved. In the present embodiment, in which Conditional Expression (17) is satisfied, occurrence of chromatic aberration of magnification can be suppressed over the entire range from the wide-angle end to the telescopic end.

Further, in the projection system 3A, out of the negative lenses of the first lens group LG1, the third lens L3 disposed on the demagnifying side has a concave magnifying-side surface and a concave demagnifying-side surface and satisfies Conditional Expression (18) below, $$60 < vd13 < 95 \quad (18)$$

where vd13 is the Abbe number of the third lens L3.

In the present embodiment, vd13=81.55. In the present embodiment, in which Conditional Expression (18) is satisfied, occurrence of chromatic aberration of magnification can be readily suppressed particularly at the telescopic end.

The projection system 3A satisfies Conditional Expression (19) below, $$1.4 \leq BF/fw \leq 2.0 \quad (19)$$

where BF represents the air conversion length of the back focal length at the wide-angle end.

In the present embodiment, BF=31.19 and fw=18.21. Therefore, BF/fw=1.71 is achieved. In the present embodiment, in which Conditional Expression (19) is satisfied, the back focal length is readily ensured with deterioration of the optical performance of the projection system 3A suppressed.

Figure 4:
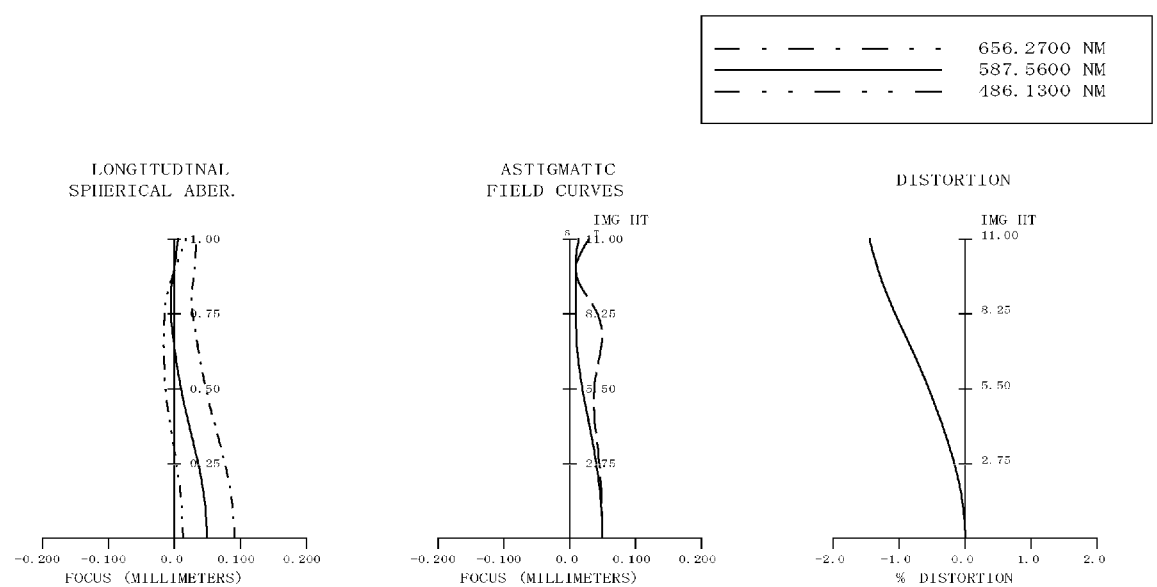
FIG. 4 shows aberrations produced by the projection system according to Embodiment 1 at the wide-angle end.
Figure 5:
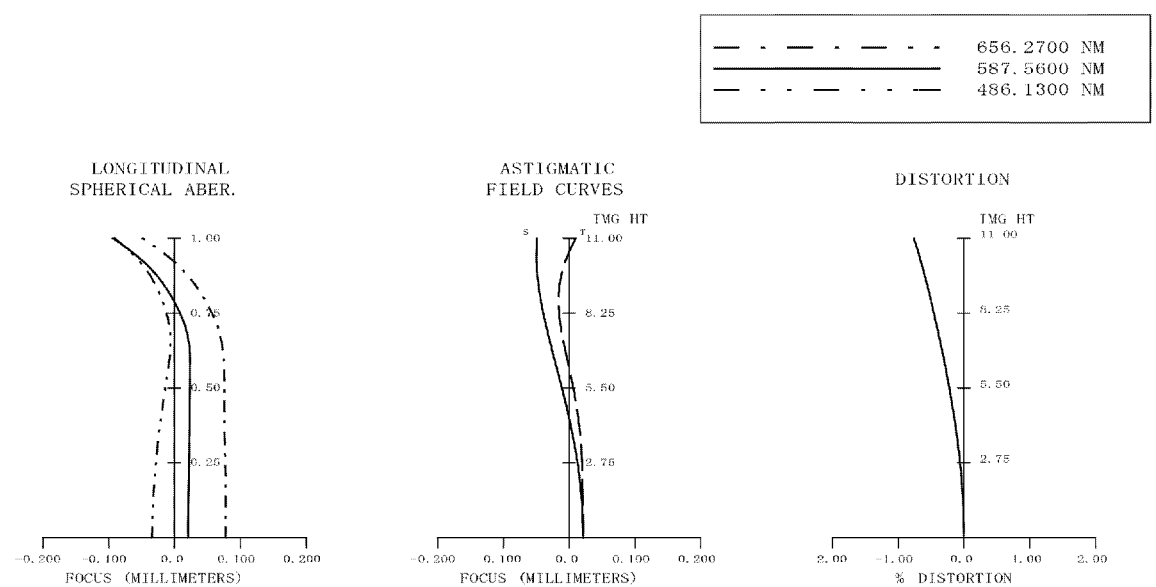
FIG. 5 shows aberrations produced by the projection system according to Embodiment 1 at the telescopic end.

FIG. 4 shows aberrations produced by the projection system 3A at the wide-angle end. FIG. 4 shows the spherical aberration, astigmatism, and distortion. FIG. 5 shows aberrations produced by the projection system 3A at the telescopic end. FIG. 5 shows the spherical aberration, astigmatism, and distortion. In the projection system 3A, the spherical aberration, astigmatism, and distortion are satisfactorily corrected, as shown in FIGS. 4 and 5.

Embodiment 2

Figure 6:
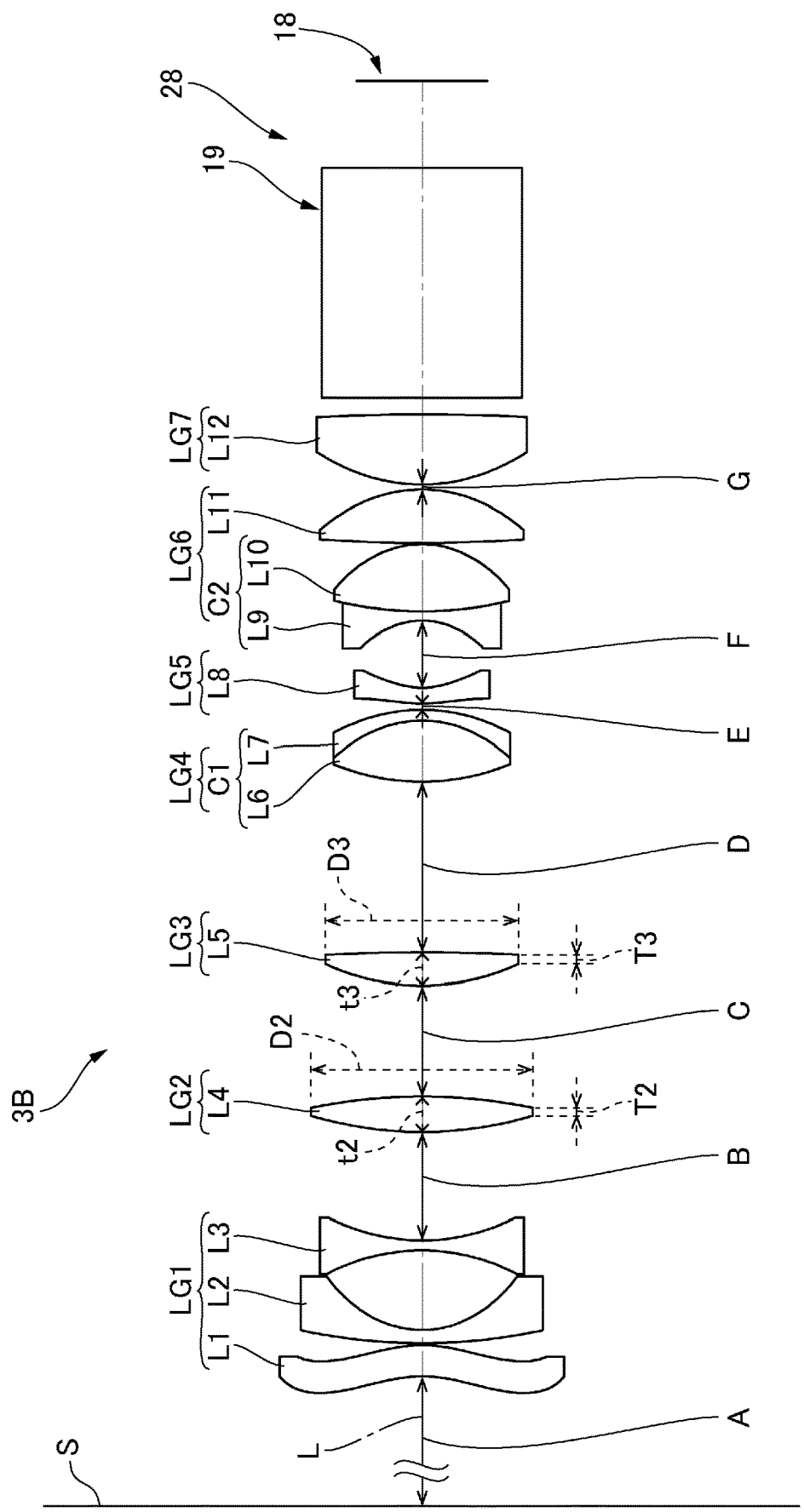
FIG. 6 is a lens configuration diagram of a projection system according to Embodiment 2 at the wide-angle end.
Figure 7:
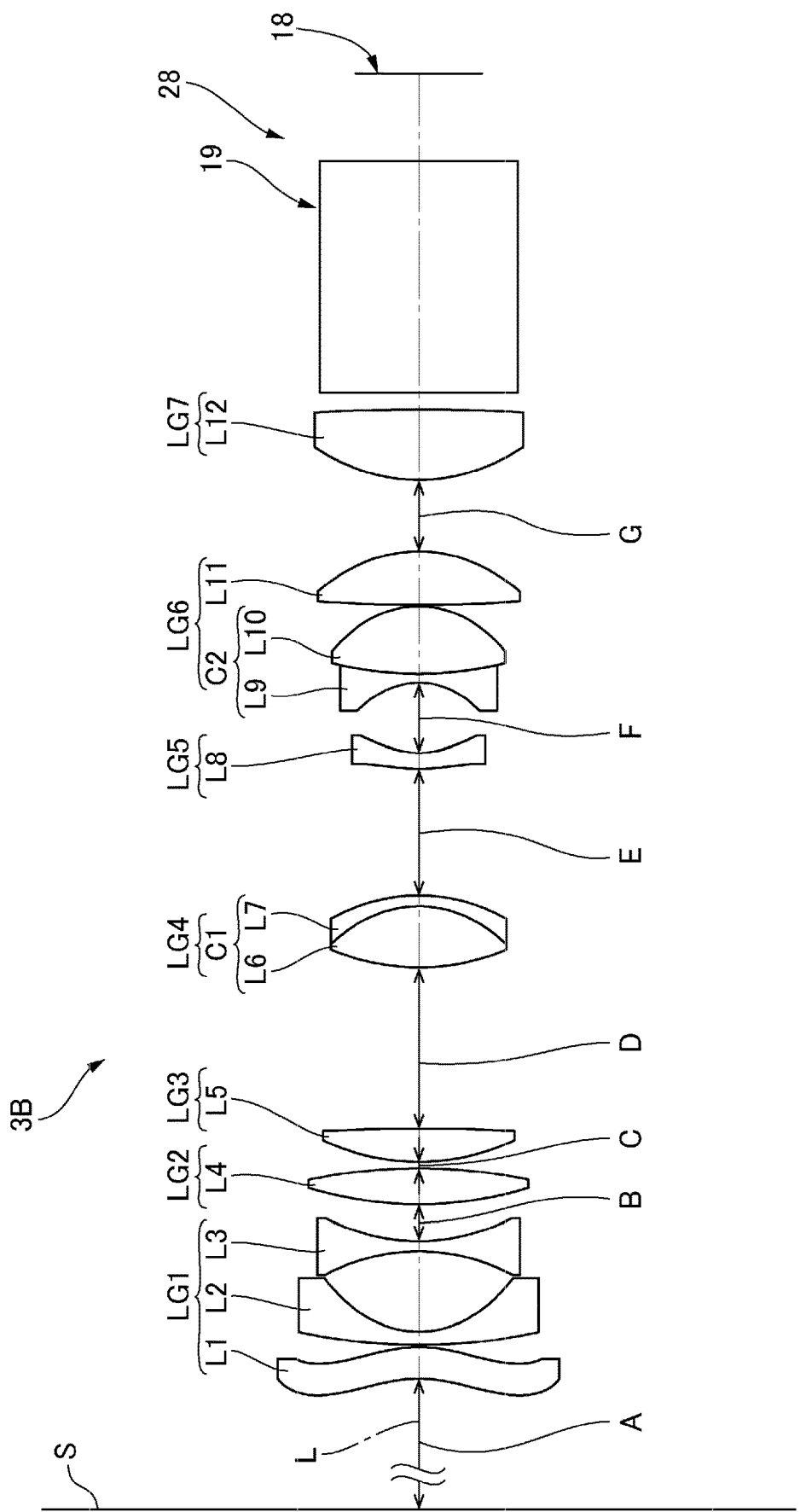
FIG. 7 is a lens configuration diagram of the projection system according to Embodiment 2 at the telescopic end.

FIGS. 6 and 7 are configuration diagrams of a projection system according to Embodiment 2. In FIG. 6, the lenses that form the projection system according to the present embodiment are disposed in positions in the wide-angle end arrangement, which minimizes the focal length of the projection system. In FIG. 7, the lenses that form the projection system according to the present embodiment are disposed in positions in the telescopic end arrangement, which maximizes the focal length of the projection system.

A projection system 3B according to the present embodiment is formed of 12 lenses L1 to L12, as shown in FIGS. 6 and 7. That is, the projection system 3B includes a first lens L1 to a twelfth lens L12 (demagnifying-side lens) sequentially from the magnifying side where the screen S is located toward the demagnifying side where the liquid crystal panels 18 are located. The projection system 3B is formed of a first lens group LG1, a second lens group LG2, a third lens group LG3, a fourth lens group LG4, a fifth lens group LG5, a sixth lens group LG6, and a seventh lens group LG7 sequentially from the magnifying side toward the demagnifying side. The first lens group LG1 and the fifth lens group LG5 each have negative power. The second lens group LG2, the third lens group LG3, the fourth lens group LG4, the sixth lens group LG6, and the seventh lens group LG7 each have positive power. The lens groups LG1 to LG7 of the projection system 3B have negative power, positive power, positive power, positive power, negative power, positive power, and positive power, respectively, sequentially from the magnifying side toward the demagnifying side. The lenses L1 to L12, which form the projection system 3B, are made, for embodiment, of glass or resin.

The projection system 3B has a zooming function that changes the projection magnification. At the time of a change in magnification when the projection magnification is changed, the second lens group LG2, the third lens group LG3, the fourth lens group LG4, the fifth lens group LG5, and the sixth lens group LG6 move along the optical axis L. On the other hand, the first lens group LG1 and the seventh lens group LG7 are fixed and do not move at the time of a change in magnification. At the time of focusing, the first lens group LG1 is moved along the optical axis L.

The liquid crystal panels 18 are located in the demagnifying-side conjugate plane of the projection system 3B. The cross dichroic prism 19 is located between the seventh lens group LG7 and the liquid crystal panels 18. The liquid crystal panels 18 and the cross dichroic prism 19 form a telecentric system 28. Light rays from the telecentric system 28 therefore enter the twelfth lens L12, which is the lens closest to the demagnifying side. In other words, the optical path from the liquid crystal panels 18 to the twelfth lens L12 is telecentric or substantially telecentric with respect to the optical axis L.

The first lens group LG1 includes three lenses, the first lens L1, the second lens L2, and the third lens L3 (demagnifying-side negative lens) sequentially from the magnifying side toward the demagnifying side. The first lens group LG1 includes at least two negative lenses. In the present embodiment, the first lens L1, the second lens L2, and the third lens L3 are each a negative lens.

The first lens L1 is made of resin and has an aspheric magnifying-side surface and an aspheric demagnifying-side surface. The magnifying-side surface of the first lens L1 has the center of paraxial curvature located at the magnifying side, and the orientation of the amount of sag changes at a point on the surface. The demagnifying-side surface of the first lens L1 has the center of paraxial curvature located at the magnifying side, and the orientation of the amount of sag changes at a point on the surface. The first lens L1 has a larger effective diameter than those of the other lenses L2 to L12, which form the projection system 3B. The second lens L2 is a meniscus lens having a convex shape on the magnifying side. The third lens L3 has a concave magnifying-side surface and a concave demagnifying-side surface.

The second lens group LG2 is formed of the fourth lens L4. The fourth lens L4 is a positive lens. The third lens group LG3 is formed of the fifth lens L5. The fifth lens L5 is a positive lens. The fourth lens group LG4 is formed of the sixth lens L6 and the seventh lens L7. The sixth lens L6 is a positive lens. The seventh lens L7 is a negative lens. The magnifying-side surface of the seventh lens L7 has the center of curvature located at the magnifying side. The demagnifying-side surface of the seventh lens L7 has the center of curvature located at the magnifying side. The sixth lens L6 and the seventh lens L7 form a first doublet C1.

The fifth lens group LG5 is formed of the eighth lens L8. The eighth lens L8 is a negative lens. The eighth lens L8 has an aspheric magnifying-side surface and an aspheric demagnifying-side surface. The magnifying-side surface of the eighth lens L8 has the center of curvature located at the demagnifying side. The demagnifying-side surface of the eighth lens L8 has the center of curvature located at the demagnifying side. The eighth lens L8 has a smaller effective diameter than those of the other lenses L1 to L7 and L9 to L12, which form the projection system 3B. The sixth lens group LG6 is formed of the ninth lens L9, the tenth lens L10, and the eleventh lens L11. The ninth lens L9 is a negative lens. The tenth lens L10 is a positive lens. The eleventh lens L11 is a positive lens. The ninth lens L9 and the tenth lens L10 form a second doublet C2. The seventh lens group LG7 is formed of the twelfth lens L12. The twelfth lens L12 is a positive lens.

Data on the projection system 3B are shown below. It is assumed in the present embodiment that the reference wavelength $\lambda$ is 587.56 nm. The foal length f, the back focal length (air conversion length) BF, and the effective image diameter are each expressed in millimeters. FNO represents the f number.

|  | Wide-angle end | Telescopic end |
| --- | --- | --- |
| f (focal length) | 18.21 | 29.11 |
| FNO | 1.48 | 1.74 |
| BF (in air) | 31.09 | 31.09 |
| Effective image diameter | φ22.00 | φ22.00 |
| ω (half field angle) | 31.5° | 20.7° |

The lens data on the lenses L1 to L12, which form the projection system 3B, are shown below. The field of "Lens" shows reference characters with which the lenses are labeled. The surfaces of the lenses are numbered sequentially from the demagnifying side toward the magnifying side. A surface having a surface number with * is an aspheric surface. The surface number S0 represents the screen S, which is the magnifying-side conjugate plane. The surface numbers S23 and S24 represent the magnifying-side surface and the demagnifying-side surface of an inserted object that is an optical member disposed in the optical path between the image display devices (liquid crystal panels 18R, 18G, and 18B) and a surface of the twelfth lens L12 that is the surface having the surface number S22 with the optical member converted into a planar glass plate made of the same material as that of the optical member. The optical member disposed in the optical path between the image display devices (liquid crystal panels 18R, 18G, and 18B) and a surface of the twelfth lens L12 that is the surface having the surface number S22 is, for embodiment, the cross dichroic prism 19. Reference character R represents a radius of curvature in millimeters. Reference character d represents an on-axis inter-surface spacing in millimeters. Reference character nd represents a refractive index. Reference character vd represents an Abbe number. An on-axis inter-surface spacing A is the distance between the screen S and the first lens group LG1. An on-axis inter-surface spacing B is the distance between the first lens group LG1 and the second lens group LG2. An on-axis inter-surface spacing C is the distance between the second lens group LG2 and the third lens group LG3. An on-axis inter-surface spacing D is the distance between the third lens group LG3 and the fourth lens group LG4. An on-axis inter-surface spacing E is the distance between the fourth lens group LG4 and the fifth lens group LG5. An on-axis inter-surface spacing F is the distance between the fifth lens group LG5 and the sixth lens group LG6. An on-axis inter-surface spacing G is the distance between the sixth lens group LG6 and the seventh lens group LG7. The on-axis inter-surface spacings B to G each change at the time of a change in magnification.

| Lens | Surface number | R | d | nd | vd |
|---|---|---|---|---|---|
| | S0 | INFINITY | A | | |
| L1 | S1* | −31.353 | 3.8 | 1.53110 | 55.91 |
| | S2* | −32.336 | 0.25 | | |
| L2 | S3 | 138.170 | 1.6 | 1.48749 | 70.24 |
| | S4 | 23.655 | 9.717 | | |
| L3 | S5 | −47.030 | 1.2 | 1.49700 | 81.55 |
| | S6 | 48.100 | B | | |
| L4 | S7 | 90.930 | 4.33 | 1.83400 | 37.16 |
| | S8 | −131.340 | C | | |
| L5 | S9 | 53.800 | 4 | 1.51633 | 64.14 |
| | S10 | −445.000 | D | | |
| L6 | S11 | 54.530 | 7.4 | 1.53775 | 74.7 |
| L7 | S12 | −27.310 | 1.3 | 1.80610 | 33.27 |
| | S13 | −42.380 | E | | |
| L8 | S14* | 39.940 | 1.9 | 1.80625 | 40.91 |
| | S15* | 18.755 | F | | |
| L9 | S16 | −18.175 | 1.1 | 1.72047 | 34.71 |
| L10 | S17 | 85.860 | 8.2 | 1.49700 | 81.55 |
| | S18 | −23.020 | 0.15 | | |
| L11 | S19 | 358.600 | 6.47 | 1.74320 | 49.34 |
| | S20 | −33.520 | G | | |
| L12 | S21 | 42.600 | 8.55 | 1.48749 | 70.24 |
| | S22 | −472.200 | 2 | | |
| | S23 | 1.00E+18 | 28 | 1.51680 | 64.2 |
| | S24 | 1.00E+18 | 10.628 | | |

Aspheric coefficients of the aspheric surfaces of the first lens L1 that are labeled with the surface numbers S1 and S2 are shown below. Reference character K represents the Conic constant.

| | Surface number | |
|---|---|---|
| | S1 | S2 |
| Radius of curvature in direction Y | −31.353 | −32.336 |
| K | −6.1744 | 0.243 |
| Fourth-order coefficient | 2.75917E−05 | 4.92342E−05 |
| Sixth-order coefficient | −5.26305E−08 | −8.32432E−08 |
| Eighth-order coefficient | 9.58178E−11 | 1.54424E−10 |
| Tenth-order coefficient | −7.52712E−14 | −1.01681E−13 |
| Twelfth-order coefficient | −1.49220E−17 | −1.02493E−16 |
| Fourteenth-order coefficient | 7.11413E−20 | 2.36925E−19 |

The amounts of sag of the surfaces of the first lens L1 that are labeled with the surface numbers S1 and S2 are shown below. The effective height, the sag, and the amount of change are each expressed in millimeters.

| | Amount of sag on surface S1 | | Amount of sag on surface S2 | |
|---|---|---|---|---|
| Effective height | Sag | Amount of change | Sag | Amount of change |
| 0 | 0.000 | — | 0.000 | — |
| 1 | −0.016 | −0.016 | −0.015 | −0.015 |
| 2 | −0.063 | −0.047 | −0.061 | −0.046 |
| 3 | −0.140 | −0.077 | −0.136 | −0.074 |
| 4 | −0.243 | −0.103 | −0.236 | −0.101 |
| 5 | −0.370 | −0.127 | −0.360 | −0.124 |
| 6 | −0.516 | −0.146 | −0.503 | −0.143 |
| 7 | −0.676 | −0.160 | −0.660 | −0.157 |
| 8 | −0.846 | −0.170 | −0.827 | −0.167 |
| 9 | −1.020 | −0.175 | −0.999 | −0.172 |
| 10 | −1.195 | −0.174 | −1.172 | −0.173 |
| 11 | −1.364 | −0.169 | −1.340 | −0.168 |
| 12 | −1.523 | −0.159 | −1.499 | −0.159 |
| 13 | −1.668 | −0.145 | −1.645 | −0.145 |
| 14 | −1.794 | −0.126 | −1.771 | −0.127 |
| 15 | −1.896 | −0.102 | −1.874 | −0.103 |
| 16 | −1.970 | −0.073 | −1.947 | −0.073 |
| 17 | −2.008 | −0.038 | −1.982 | −0.035 |
| 18 | −2.004 | 0.004 | −1.970 | 0.012 |
| 19 | −1.950 | 0.054 | −1.897 | 0.073 |
| 20 | −1.835 | 0.116 | −1.744 | 0.154 |
| 21 | −1.642 | 0.193 | −1.476 | 0.268 |
| 22 | −1.348 | 0.294 | −1.037 | 0.439 |
| 23 | −0.915 | 0.432 | | |

Aspheric coefficients of the aspheric surfaces of the eighth lens L8 that are labeled with the surface numbers S14 and S15 are shown below. Reference character K represents the Conic constant.

| | Surface number | |
|---|---|---|
| | S14 | S15 |
| Radius of curvature in direction Y | 39.94 | 18.755 |
| K | 0 | 0 |
| Fourth-order coefficient | −1.02509E−04 | −1.15327E−04 |
| Sixth-order coefficient | 3.86744E−07 | 4.05831E−07 |
| Eighth-order coefficient | 2.52239E−10 | 1.15118E−09 |
| Tenth-order coefficient | −1.44688E−11 | −3.32133E−11 |
| Twelfth-order coefficient | 5.82186E−14 | 1.84162E−13 |
| Fourteenth-order coefficient | −2.64717E−17 | −3.27692E−16 |

The values of the on-axis inter-surface spacings A to G at the wide-angle end and the telescopic end are shown below.

| | Wide-angle end | Telescopic end |
|---|---|---|
| A | 2000 | 2000 |
| B | 13.158 | 4.431 |
| C | 13.503 | 0.8 |
| D | 20.819 | 19.451 |
| E | 0.8 | 15.35 |
| F | 8.153 | 8.443 |
| G | 0.6 | 8.558 |

In the projection system 3B, $\omega=31.5°$ is achieved, where $\omega$ represents the maximum half field angle at the wide-angle end.

The projection system 3B satisfies Conditional Expression (1) below, $$1.2 < |f1/fw| < 1.5 \quad (1)$$

where fw represents the focal length of the entire optical system at the wide-angle end, and f1 represents the focal length of the first lens group LG1.

In the present embodiment, f1=−23.23 and fw=18.21. Therefore, |f1/fw|=1.28 is achieved. In the present embodiment, in which Conditional Expression (1) is satisfied, the back focal length can be ensured with the optical performance of the projection system 3B maintained.

The projection system 3B further satisfies Conditional Expression (2) below, $$1.4 \leq ft/fw \leq 1.8 \tag{2}$$

where fw represents the focal length of the entire optical system at the wide-angle end, and ft represents the focal length of the entire optical system at the telescopic end.

In the present embodiment, ft=29.11 and fw=18.21. Therefore, ft/fw=1.6 is achieved. In the present embodiment, in which Conditional Expression (2) is satisfied, predetermined magnification and desired optical performance can be provided.

The projection system 3B then satisfies Conditional Expressions (3) and (4) below, $$1.4 \leq FNw \leq 1.8 \tag{3}$$

$$1.05 < FNt/FNw < 1.25 \tag{4}$$

where FNw represents FNO at the wide-angle end, and FNt represents FNO at the telescopic end.

In the present embodiment, FNw=1.48 and FNt=1.74. Therefore, FNt/FNw=1.18 is achieved. In the present embodiment, in which Conditional Expression (3) is satisfied, predetermined brightness and desired optical performance can be provided. Further, in the present embodiment, in which Conditional Expression (4) is satisfied, large variation in brightness achieved by the projection system 3B due to a change in magnification can be suppressed.

The projection system 3B satisfies Conditional Expression (5) below, $$1.5 < |f5/fw| < 3.5 \tag{5}$$

where f5 represents the focal length of the fifth lens group LG5 (eighth lens L8), and fw represents the focal length of the entire optical system at the wide-angle end.

In the present embodiment, f5=−45.68 and fw=18.21. Therefore, |f5/fw|=2.51 is achieved. In the present embodiment, in which Conditional Expression (5) is satisfied, comma and field curvature can be corrected.

The projection system 3B further satisfies Conditional Expression (6) below, $$1.75 < nd2 < 2.0 \tag{6}$$

where nd2 represents the refractive index of the positive lens (fourth lens L4) of the second lens group LG2.

In the present embodiment, nd2=1.83400. In the present embodiment, when the refractive index of the second lens group LG2 (fourth lens L4) is specified at a relatively large value in accordance with Conditional Expression (6), the first lens group LG1 can capture an appropriate amount of light. An increase in the size of each of the lenses L1 to L3, which form the first lens group LG1, can thus be suppressed. Further, specifying the refractive index of the second lens group LG2 (fourth lens L4) at a relatively large value allows suppression of occurrence of field curvature.

The projection system 3B satisfies Conditional Expressions (7) and (8) below, $$0.2 < nd42 - nd41 < 0.5 \tag{7}$$

$$20 < v41 - v42 < 70 \tag{8}$$

where nd41 and v41 represent the refractive index and the Abbe number of a positive lens closest to the magnifying side in the fourth lens group LG4 (sixth lens L6, which is magnifying-side lens of first doublet C1), respectively, and nd42 and v42 represent the refractive index and the Abbe number of the negative lens in the fourth lens group LG4 (seventh lens L7, which is demagnifying-side lens of first doublet C1), respectively.

In the present embodiment, nd41=1.53775 and nd42=1.80610. Therefore, nd42−nd41=0.268 is achieved. Further, in the present embodiment, v41=74.7 and v42=33.27. Therefore, v41−v42=41.43 is achieved. In the present embodiment, in which Conditional Expression (7) is satisfied, an increase in spherical aberration at the telescopic end can be suppressed. Further, in the present embodiment, in which Conditional Expression (8) is satisfied, variation in axial chromatic aberration can be suppressed when the magnification is changed.

The projection system 3B then satisfies Conditional Expressions (9) and (10) below.

$$5 < D2/t2 < 15 \tag{9}$$

$$6 < D3/t3 < 15 \tag{10}$$

In Conditional Expression (9), D2 represents the diameter of a portion of the positive lens (fourth lens L4) of the second lens group LG2 that is the portion where the edge thickness T2 of the fourth lens L4 is 1 mm, and t2 represents the center thickness of the positive lens (fourth lens L4) of the second lens group LG2. In Conditional Expression (10), D3 represents the diameter of a portion of the positive lens (fifth lens L5) of the third lens group LG3 that is the portion where the edge thickness T3 of the fifth lens L5 is 1 mm, and t3 represents the center thickness of the positive lens (fifth lens L5) of the third lens group LG3.

In the present embodiment, D2=37.65 and t2=4.33. Therefore, D2/t2=8.7 is achieved. Further, in the present embodiment, D3=33.55 and t3=4. Therefore, D3/t3=8.4 is achieved. In the present embodiment, in which Conditional Expression (9) is satisfied, a situation in which the fourth lens L4 has a large thickness can be avoided. Further, in the present embodiment, in which Conditional Expression (10) is satisfied, a situation in which the fifth lens L5 has a large thickness can be avoided. In the present embodiment, the fourth lens L4 and the fifth lens L5 are made of glass. Therefore, when the fourth lens L4 and the fifth lens L5 each have a small thickness, the manufacturing cost of the lenses is likely to be suppressed.

The projection system 3B satisfies Conditional Expression (11) below, $$1.65 < nd5 < 1.85 \tag{11}$$

where nd5 represents the refractive index of the negative lens (eighth lens L8) of the fifth lens group LG5.

In the present embodiment, nd5=1.80625. In the present embodiment, in which Conditional Expression (11) is satisfied, occurrence of field curvature can be suppressed. Further, an increase in cost required to manufacture the eighth lens L8 can be suppressed.

Further, the projection system 3B satisfies Conditional Expression (12) below, $$0.53 < Pg5 < 0.61 \tag{12}$$

where Pg5 represents the partial dispersion ratio between the g line and the F line dispersed by the negative lens (eighth lens L8) of the fifth lens group LG5.

In the present embodiment, Pg5=0.569. In the present embodiment, in which Conditional Expression (12) is satisfied, occurrence of chromatic aberration of magnification can be suppressed.

The projection system. 3B then satisfies Conditional Expression (13) below, $$0.2 < nd61 - nd62 < 0.5 \tag{13}$$

where nd61 represents the refractive index of the magnifying-side negative lens (ninth lens L9) of the second doublet C2, which forms the sixth lens group LG6, at the d line, and nd62 represents the refractive index of the demagnifying-side positive lens (tenth lens L10) of the second doublet C2 at the d line.

In the present embodiment, nd61=1.72047 and nd62=1.49700. Therefore, nd61−nd62=0.22 is achieved. In the present embodiment, in which Conditional Expression (13) is satisfied, occurrence of field curvature can be suppressed.

The projection system 3B satisfies Conditional Expression (14) below, $$30 < vd62 - vd61 < 70 \tag{14}$$

where vd61 represents the Abbe number of the magnifying-side negative lens (ninth lens L9) of the second doublet C2, which forms the sixth lens group LG6, and vd62 represents the Abbe number of the demagnifying-side positive lens (tenth lens L10) of the second doublet C2.

In the present embodiment, vd61=34.71 and vd62=81.55. Therefore, vd62−vd61=46.84 is achieved. In the present embodiment, in which Conditional Expression (14) is satisfied, occurrence of chromatic aberration of magnification can be suppressed.

The projection system 3B satisfies Conditional Expression (15) below, $$0 < nd2 - nd3 < 0.35 \tag{15}$$

where nd2 represents the refractive index of the positive lens (fourth lens L4) of the second lens group LG2 at the d line, and nd3 represents the refractive index of the positive lens (fifth lens L5) of the third lens group LG3 at the d line.

In the present embodiment, nd2=1.83400 and nd3=1.51633. Therefore, nd2−nd3=0.32 is achieved. In the present embodiment, in which Conditional Expression (15) is satisfied, field curvature that occurs when the magnification is changed can be suppressed. Variation in the field curvature at the time of a change in magnification can further be suppressed.

The projection system 3B further satisfies Conditional Expression (16) below, $$|vd2 - vd3| < 30 \tag{16}$$

where vd2 represents the Abbe number of the positive lens (fourth lens L4) of the second lens group LG2, and vd3 represents the Abbe number of the positive lens (fifth lens L5) of the third lens group LG3.

In the present embodiment, vd2=37.16 and vd3=64.14. Therefore, |vd2−vd3|=26.98 is achieved. In the present embodiment, in which Conditional Expression (16) is satisfied, variation in the chromatic aberration of magnification at the time of a change in magnification can be suppressed.

The first lens L1 of the projection system 3B has an aspheric magnifying-side surface and an aspheric demagnifying-side surface, and the surfaces having the surface numbers S1 and S2 each have the center of paraxial curvature located at the magnifying side. Further, the orientation of the amount of sag changes at a point on each of the surfaces having the surface numbers S1 and S2 of the first lens L1. That is, the amount of change in sag is reversed at a point on each of the surfaces having the surface numbers S1 and S2. The f number can therefore be reduced to a small number. That is, the brightness achieved by the projection system 3B can be readily increased. Further, distortion of the peripheral light and the field curvature can be readily corrected.

The seventh lens group LG7 (twelfth lens L12) is a positive lens and satisfies Conditional Expression (17) below, $$PgF1 > -0.0016 \times vdF1 + 0.62 \tag{17}$$

where PgF1 represents the partial dispersion ratio between the g line and the F line dispersed by the seventh lens group LG7 (twelfth lens L12), and vdF1 represents the Abbe number thereof.

In the present embodiment, PgF1=0.530 and vdF1=70.23. Therefore, −0.0016×vdF1+0.62=0.508 is achieved. In the present embodiment, in which Conditional Expression (17) is satisfied, occurrence of chromatic aberration of magnification can be suppressed over the entire range from the wide-angle end to the telescopic end.

Further, in the projection system 3B, out of the negative lenses of the first lens group LG1, the third lens L3 disposed on the demagnifying side has a concave magnifying-side surface and a concave demagnifying-side surface and satisfies Conditional Expression (18) below, $$60 < vd13 < 95 \tag{18}$$

where vd13 is the Abbe number of the third lens L3.

In the present embodiment, vd13=81.55. In the present embodiment, in which Conditional Expression (18) is satisfied, occurrence of chromatic aberration of magnification can be readily suppressed particularly at the telescopic end.

The projection system 3B satisfies Conditional Expression (19) below, $$1.4 \leq BF/fw \leq 2.0 \tag{19}$$

where BF represents the air conversion length of the back focal length at the wide-angle end.

In the present embodiment, BF=31.09 and fw=18.21. Therefore, BF/fw=1.71 is achieved. In the present embodiment, in which Conditional Expression (19) is satisfied, the back focal length is readily ensured with deterioration of the optical performance of the projection system 3B suppressed.

Figure 8:
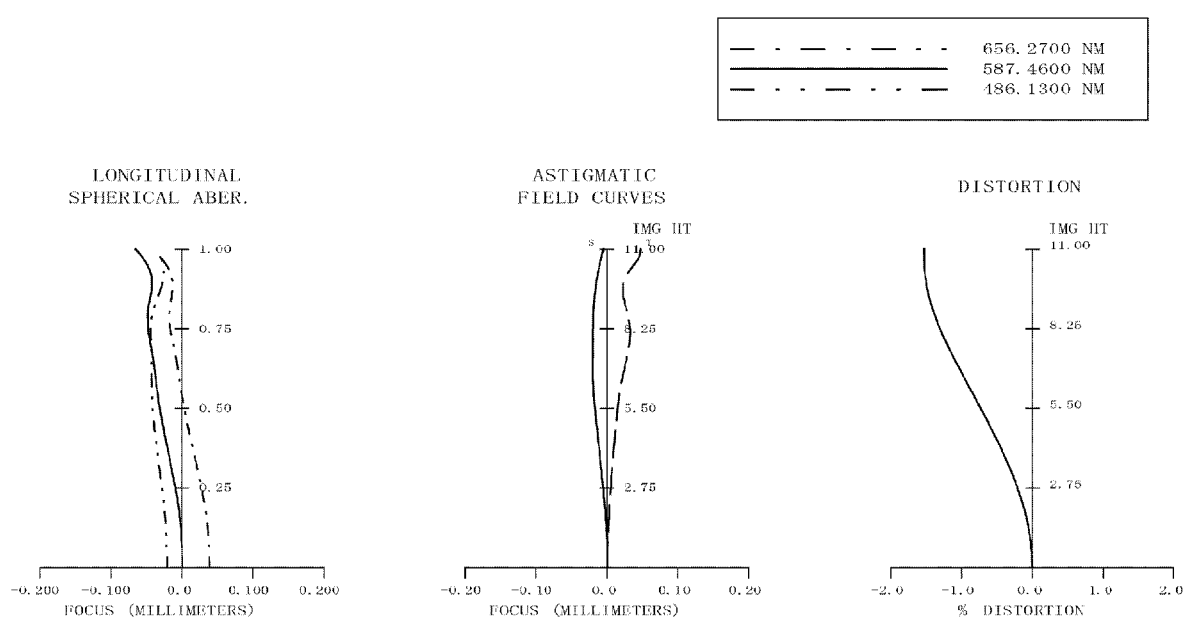
FIG. 8 shows aberrations produced by the projection system according to Embodiment 2 at the wide-angle end.
Figure 9:
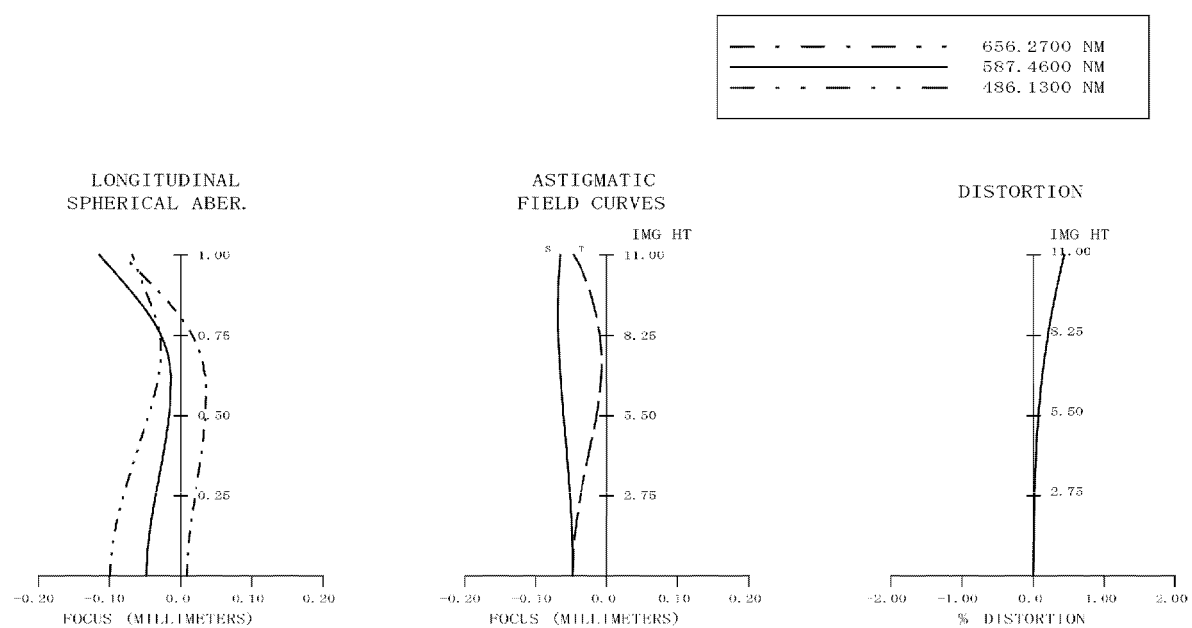
FIG. 9 shows aberrations produced by the projection system according to Embodiment 2 at the telescopic end.

FIG. 8 shows aberrations produced by the projection system 3B at the wide-angle end. FIG. 8 shows the spherical aberration, astigmatism, and distortion. FIG. 9 shows aberrations produced by the projection system 3B at the telescopic end. FIG. 9 shows the spherical aberration, astigmatism, and distortion. In the projection system 3B, the spherical aberration, astigmatism, and distortion are satisfactorily corrected, as shown in FIGS. 8 and 9.

Embodiment 3

Figure 10:
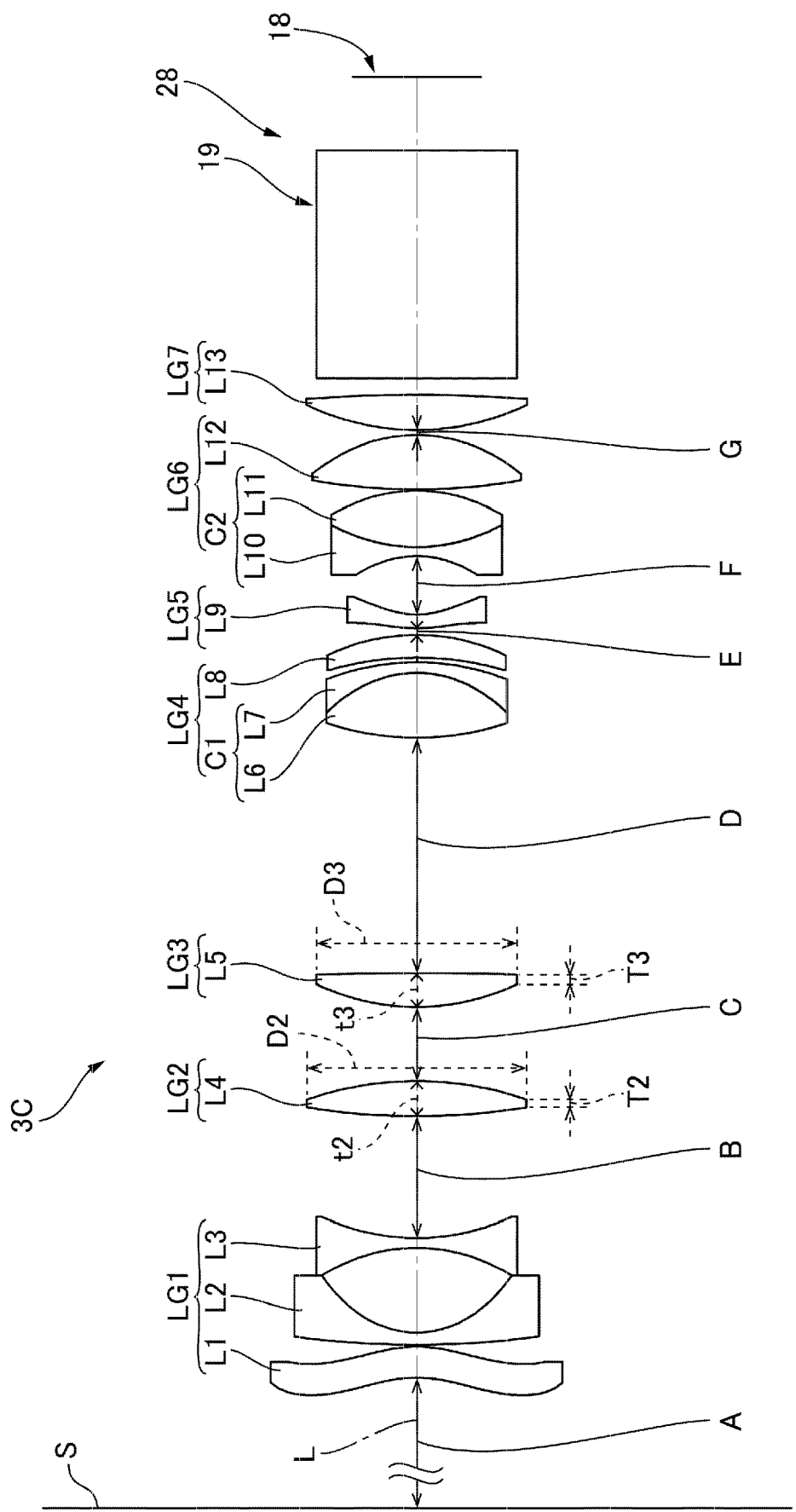
FIG. 10 is a lens configuration diagram of a projection system according to Embodiment 3 at the wide-angle end.
Figure 11:
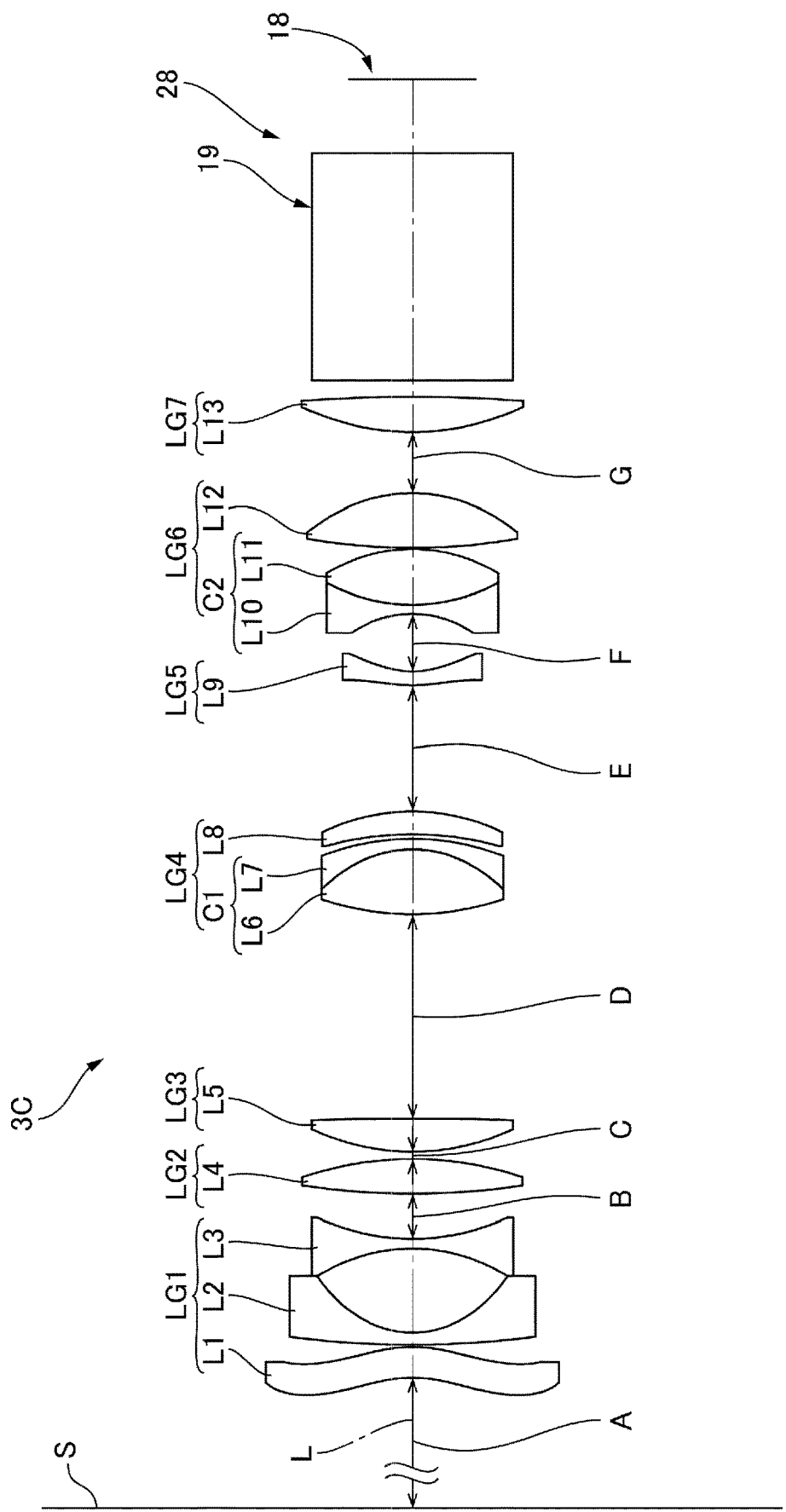
FIG. 11 is a lens configuration diagram of the projection system according to Embodiment 3 at the telescopic end.

FIGS. 10 and 11 are configuration diagrams of a projection system according to Embodiment 3. In FIG. 10, the lenses that form the projection system according to the present embodiment are disposed in positions in the wide-angle end arrangement, which minimizes the focal length of the projection system. In FIG. 11, the lenses that form the projection system according to the present embodiment are disposed in positions in the telescopic end arrangement, which maximizes the focal length of the projection system.

A projection system 3C according to the present embodiment is formed of 13 lenses L1 to L13, as shown in FIGS. 10 and 11. That is, the projection system 3C includes first lens L1 to a thirteenth lens L13 (demagnifying-side lens) sequentially from the magnifying side where the screen S is located toward the demagnifying side where the liquid crystal panels 18 are located. The projection system 3C is formed of a first lens group LG1, a second lens group LG2, a third lens group LG3, a fourth lens group LG4, a fifth lens group LG5, a sixth lens group LG6, and a seventh lens group LG7 sequentially from the magnifying side toward the demagnifying side. The first lens group LG1 and the fifth lens group LG5 each have negative power. The second lens group LG2, the third lens group LG3, the fourth lens group LG4, the sixth lens group LG6, and the seventh lens group LG7 each have positive power. The lens groups LG1 to LG7 of the projection system 3C have negative power, positive power, positive power, positive power, negative power, positive power, and positive power, respectively, sequentially from the magnifying side toward the demagnifying side. The lenses L1 to L13, which form the projection system 3C, are made, for embodiment, of glass or resin.

The projection system. 3C has a zooming function that changes the projection magnification. At the time of a change in magnification when the projection magnification is changed, the second lens group LG2, the third lens group LG3, the fourth lens group LG4, the fifth lens group LG5, and the sixth lens group LG6 move along the optical axis L. On the other hand, the first lens group LG1 and the seventh lens group LG7 are fixed and do not move at the time of a change in magnification. At the time of focusing, the first lens group LG1 is moved along the optical axis L.

The liquid crystal panels 18 are located in the demagnifying-side conjugate plane of the projection system 3C. The cross dichroic prism 19 is located between the seventh lens group LG7 and the liquid crystal panels 18. The liquid crystal panels 18 and the cross dichroic prism 19 form a telecentric system 28. Light rays from the telecentric system 28 therefore enter the thirteenth lens L13, which is the lens closest to the demagnifying side. In other words, the optical path from the liquid crystal panels 18 to the thirteenth lens L13 is telecentric or substantially telecentric with respect to the optical axis L.

The first lens group LG1 includes three lenses, the first lens L1, the second lens L2, and the third lens L3 (demagnifying-side negative lens) sequentially from the magnifying side toward the demagnifying side. The first lens group LG1 includes at least two negative lenses. In the present embodiment, the first lens L1, the second lens L2, and the third lens L3 are each a negative lens.

The first lens L1 is made of resin and has an aspheric magnifying-side surface and an aspheric demagnifying-side surface. The magnifying-side surface of the first lens L1 has the center of paraxial curvature located at the magnifying side, and the orientation of the amount of sag changes at a point on the surface. The demagnifying-side surface of the first lens L1 has the center of paraxial curvature located at the magnifying side, and the orientation of the amount of sag changes at a point on the surface. The first lens L1 has a larger effective diameter than those of the other lenses L2 to L13, which form the projection system 3C. The second lens L2 is a meniscus lens having a convex shape on the magnifying side. The third lens L3 has a concave magnifying-side surface and a concave demagnifying-side surface.

The second lens group LG2 is formed of the fourth lens L4. The fourth lens L4 is a positive lens. The third lens group LG3 is formed of the fifth lens L5. The fifth lens L5 is a positive lens.

The fourth lens group LG4 is formed of the sixth lens L6, the seventh lens L7, and the eighth lens L8. The sixth lens L6 is a positive lens. The seventh lens L7 is a negative lens. The magnifying-side surface of the seventh lens L7 has the center of curvature located at the magnifying side. The demagnifying-side surface of the seventh lens L7 has the center of curvature located at the magnifying side. The sixth lens L6 and the seventh lens L7 form a first doublet C1.

The fifth lens group LG5 is formed of the ninth lens L9. The ninth lens L9 is a negative lens. The ninth lens L9 has an aspheric magnifying-side surface and an aspheric demagnifying-side surface. The magnifying-side surface of the ninth lens L9 has the center of curvature located at the demagnifying side. The demagnifying-side surface of the ninth lens L9 has the center of curvature located at the demagnifying side. The ninth lens L9 has a smaller effective diameter than those of the other lenses L1 to L8 and L10 to L13, which form the projection system 3C. The sixth lens group LG6 is formed of the tenth lens L10, the eleventh lens L11, and the twelfth lens L12. The tenth lens L10 is a negative lens. The eleventh lens L11 is a positive lens. The twelfth lens L12 is a positive lens. The tenth lens L10 and the eleventh lens L11 form a second doublet C2. The seventh lens group LG7 is formed of the thirteenth lens L13. The thirteenth lens L13 is a positive lens.

Data on the projection system 3C are shown below. It is assumed in the present embodiment that the reference wavelength λ is 587.56 nm. The foal length f, the back focal length (air conversion length) BF, and the effective image diameter are each expressed in millimeters. FNO represents the f number.

|  | Wide-angle end | Telescopic end |
| --- | --- | --- |
| f (focal length) | 17.79 | 26.69 |
| FNO | 1.4 | 1.7 |
| BF (in air) | 29.52 | 29.52 |
| Effective image diameter | φ22.00 | φ22.00 |
| ω (half field angle) | 32.1° | 22.5° |

The lens data on the lenses L1 to L13, which form the projection system 3C, are shown below. The field of "Lens" shows reference characters with which the lenses are labeled. The surfaces of the lenses are numbered sequentially from the demagnifying side toward the magnifying side. A surface having a surface number with * is an aspheric surface. The surface number S0 represents the screen S, which is the magnifying-side conjugate plane. The surface numbers S25 and S26 represent the magnifying-side surface and the demagnifying-side surface of an inserted object that is an optical member disposed in the optical path between the image display devices (liquid crystal panels 18R, 18G, and 18B) and a surface of the thirteenth lens L13 that is the surface having the surface number S24 with the optical member converted into a planar glass plate made of the same material as that of the optical member. The optical member disposed in the optical path between the image display devices (liquid crystal panels 18R, 18G, and 18B) and a surface of the thirteenth lens L13 that is the surface having the surface number S24 is, for embodiment, the cross dichroic prism 19. Reference character R represents a radius of curvature in millimeters. Reference character d represents an on-axis inter-surface spacing in millimeters. Reference character nd represents a refractive index. Reference character vd represents an Abbe number. An on-axis inter-surface spacing A is the distance between the screen S and the first lens group LG1. An on-axis inter-surface spacing B is the distance between the first lens group LG1 and the second lens group LG2. An on-axis inter-surface spacing C is the distance between the second lens group LG2 and the third lens group LG3. An on-axis inter-surface spacing D is the distance between the third lens group LG3 and the fourth lens group LG4. An on-axis inter-surface spacing E is the distance between the fourth lens group LG4 and the fifth lens group LG5. An on-axis inter-surface spacing F is the distance between the fifth lens group LG5 and the sixth lens group LG6. An on-axis inter-surface spacing G is the distance between the sixth lens group LG6 and the seventh lens group LG7. The on-axis inter-surface spacings B to G each change at the time of a change in magnification.

| Lens | Surface number | R | d | nd | vd |
|---|---|---|---|---|---|
|  | S0 | INFINITY | A |  |  |
| L1 | S1* | −30.5270 | 3.8 | 1.53110 | 55.91 |
|  | S2* | −32.2820 | 0.25 |  |  |
| L2 | S3 | 223.1250 | 1.5 | 1.48749 | 70.24 |
|  | S4 | 23.1140 | 10.382 |  |  |
| L3 | S5 | −42.1500 | 1.2 | 1.49700 | 81.55 |
|  | S6 | 54.4000 | B |  |  |
| L4 | S7 | 176.2950 | 4.3 | 1.80420 | 46.50 |
|  | S8 | −82.3000 | C |  |  |
| L5 | S9 | 56.2000 | 4.1 | 1.59522 | 67.74 |
|  | S10 | −828.8000 | D |  |  |
| L6 | S11 | 68.4600 | 8 | 1.58913 | 61.14 |
| L7 | S12 | −27.7200 | 1.3 | 1.83400 | 37.35 |
|  | S13 | −60.2000 | 0.582 |  |  |
| L8 | S14 | −76.4000 | 2.8 | 1.80420 | 46.50 |
|  | S15 | −49.2000 | E |  |  |
| L9 | S16* | 35.8350 | 1.7 | 1.80625 | 40.91 |
|  | S17* | 19.4410 | F |  |  |
| L10 | S18 | −25.0800 | 1.1 | 1.69895 | 30.13 |
| L11 | S19 | 41.8000 | 6.9 | 1.48749 | 70.24 |
|  | S20 | −39.1000 | 0.16 |  |  |
| L12 | S21 | 151.0000 | 6.7 | 1.80420 | 46.50 |
|  | S22 | −37.0000 | G |  |  |
| L13 | S23 | 61.6000 | 4.35 | 1.69680 | 55.53 |
|  | S24 | −355.0000 | 2 |  |  |
|  | S25 | INFINITY | 28 | 1.51680 | 64.2 |
|  | S26 | INFINITY | 9.061 |  |  |

Aspheric coefficients of the aspheric surfaces of the first lens L1 that are labeled with the surface numbers S1 and S2 are shown below. Reference character K represents the Conic constant.

|  | Surface number | |
|---|---|---|
|  | S1 | S2 |
| Radius of curvature in direction Y | −30.527 | −32.282 |
| K | −6.11 | 0.355 |
| Fourth-order coefficient | 2.831896E−05 | 5.039940E−05 |
| Sixth-order coefficient | −5.454844E−08 | −8.526254E−08 |
| Eighth-order coefficient | 8.366310E−11 | 1.360817E−10 |
| Tenth-order coefficient | −6.144841E−14 | −8.673815E−14 |
| Twelfth-order coefficient | −4.148633E−19 | −3.792207E−17 |
| Fourteenth-order coefficient | 2.879177E−20 | 9.713868E−20 |

The amounts of sag of the surfaces of the first lens L1 that are labeled with the surface numbers S1 and S2 are shown below. The effective height, the sag, and the amount of change are each expressed in millimeters.

| Effective height | Amount of sag on surface S1 | | Amount of sag on surface S2 | |
|---|---|---|---|---|
|  | Sag | Amount of change | Sag | Amount of change |
| 0 | 0.000 | — | 0.000 | — |
| 1 | −0.0163 | −0.016 | −0.0154 | −0.015 |
| 2 | −0.0647 | −0.048 | −0.0612 | −0.046 |
| 3 | −0.1434 | −0.079 | −0.1358 | −0.075 |
| 4 | −0.2495 | −0.106 | −0.2366 | −0.101 |
| 5 | −0.3794 | −0.130 | −0.3602 | −0.124 |
| 6 | −0.5288 | −0.149 | −0.5027 | −0.143 |
| 7 | −0.6928 | −0.164 | −0.6597 | −0.157 |
| 8 | −0.8665 | −0.174 | −0.8265 | −0.167 |
| 9 | −1.0449 | −0.178 | −0.9986 | −0.172 |
| 10 | −1.2232 | −0.178 | −1.1713 | −0.173 |
| 11 | −1.3967 | −0.174 | −1.3406 | −0.169 |
| 12 | −1.5612 | −0.165 | −1.5024 | −0.162 |
| 13 | −1.7128 | −0.152 | −1.6533 | −0.151 |
| 14 | −1.8478 | −0.135 | −1.7898 | −0.137 |
| 15 | −1.9625 | −0.115 | −1.9088 | −0.119 |
| 16 | −2.0536 | −0.091 | −2.0070 | −0.098 |
| 17 | −2.1175 | −0.064 | −2.0810 | −0.074 |
| 18 | −2.1502 | −0.033 | −2.1270 | −0.046 |
| 19 | −2.1474 | 0.003 | −2.1400 | −0.013 |
| 20 | −2.1036 | 0.044 | −2.1135 | 0.026 |
| 21 | −2.0121 | 0.092 | −2.0381 | 0.075 |
| 22 | −1.8635 | 0.149 | −1.8990 | 0.139 |
| 23 | −1.6443 | 0.219 | −1.6725 | 0.226 |
| 24 | −1.3334 | 0.311 |  |  |

Aspheric coefficients of the aspheric surfaces of the ninth lens L9 that are labeled with the surface numbers S16 and S17 are shown below. Reference character K represents the Conic constant.

|  | Surface number | |
|---|---|---|
|  | S16 | S17 |
| Radius of curvature in direction Y | 35.835 | 19.441 |
| K | 0 | 0 |
| Fourth-order coefficient | −1.102896E−04 | −1.24304E−04 |
| Sixth-order coefficient | 3.732354E−07 | 4.42568E−07 |
| Eighth-order coefficient | 7.272159E−10 | 5.26979E−10 |
| Tenth-order coefficient | −1.957892E−11 | −2.39735E−11 |
| Twelfth-order coefficient | 9.916072E−14 | 1.35546E−13 |
| Fourteenth-order coefficient | −1.706520E−16 | −2.61793E−16 |

The values of the on-axis inter-surface spacings A to G at the wide-angle end and the telescopic end are shown below.

|  | Wide-angle end | Telescopic end |
|---|---|---|
| A | 2000 | 2000 |
| B | 14.976 | 5.495 |
| C | 9.137 | 0.884 |
| D | 28.921 | 25.14 |
| E | 0.8 | 15.494 |
| F | 7.207 | 7.111 |
| G | 0.6 | 7.517 |

In the projection system 3C, ω=32.1° is achieved, where ω represents the maximum half field angle at the wide-angle end.

The projection system 3C satisfies Conditional Expression (1) below, $$1.2 < |f1/fw| < 1.5 \quad (1)$$

where fw represents the focal length of the entire optical system at the wide-angle end, and f1 represents the focal length of the first lens group LG1.

In the present embodiment, f1=−21.61 and fw=17.79. Therefore, |f1/fw|=1.21 is achieved. In the present embodiment, in which Conditional Expression (1) is satisfied, the back focal length can be ensured with the optical performance of the projection system 3C maintained.

The projection system 3C further satisfies Conditional Expression (2) below, $$1.4 \leq ft/fw \leq 1.8 \qquad (2)$$

where fw represents the focal length of the entire optical system at the wide-angle end, and ft represents the focal length of the entire optical system at the telescopic end.

In the present embodiment, ft=26.69 and fw=17.79. Therefore, ft/fw=1.5 is achieved. In the present embodiment, in which Conditional Expression (2) is satisfied, predetermined magnification and desired optical performance can be provided.

The projection system 3C then satisfies Conditional Expressions (3) and (4) below, $$1.4 \leq FNw \leq 1.8 \qquad (3)$$

$$1.05 < FNt/FNw < 1.25 \qquad (4)$$

where FNw represents FNO at the wide-angle end, and FNt represents FNO at the telescopic end In the present embodiment, FNw=1.4 and FNt=1.7. Therefore, FNt/FNw=1.21 is achieved. In the present embodiment, in which Conditional Expression (3) is satisfied, predetermined brightness and desired optical performance can be provided. Further, in the present embodiment, in which Conditional Expression (4) is satisfied, large variation in brightness achieved by the projection system 3C due to a change in magnification can be suppressed.

The projection system 3C satisfies Conditional Expression (5) below, $$1.5 < |f5/fw| < 3.5 \qquad (5)$$

where f5 represents the focal length of the fifth lens group LG5 (ninth lens L9), and fw represents the focal length of the entire optical system at the wide-angle end.

In the present embodiment, f5=−55.27 and fw=17.79. Therefore, |f5/fw|=3.11 is achieved. In the present embodiment, in which Conditional Expression (5) is satisfied, comma and field curvature can be corrected.

The projection system 3C further satisfies Conditional Expression (6) below, $$1.75 < nd2 < 2.0 \qquad (6)$$

where nd2 represents the refractive index of the positive lens (fourth lens L4) of the second lens group LG2.

In the present embodiment, nd2=1.80420. In the present embodiment, when the refractive index of the second lens group LG2 (fourth lens L4) is specified at a relatively large value in accordance with Conditional Expression (6), the first lens group LG1 can capture an appropriate amount of light. An increase in the size of each of the lenses L1 to L3, which form the first lens group LG1, can thus be suppressed. Further, specifying the refractive index of the second lens group LG2 (fourth lens L4) at a relatively large value allows suppression of occurrence of field curvature.

The projection system 3C satisfies Conditional Expressions (7) and (8) below, $$0.2 < nd42 - nd41 < 0.5 \qquad (7)$$

$$20 < v41 - v42 < 70 \qquad (8)$$

where nd41 and v41 represent the refractive index and the Abbe number of a positive lens closest to the magnifying side in the fourth lens group LG4 (sixth lens L6, which is magnifying-side lens of first doublet C1), respectively, and nd42 and v42 represent the refractive index and the Abbe number of the negative lens in the fourth lens group LG4 (seventh lens L7, which is demagnifying-side lens of first doublet C1), respectively.

In the present embodiment, nd41=1.58913 and nd42=1.83400. Therefore, nd42−nd41=0.245 is achieved. Further, in the present embodiment, v41=61.14 and v42=37.35. Therefore, v41-v42=23.79 is achieved. In the present embodiment, in which Conditional Expression (7) is satisfied, an increase in spherical aberration at the telescopic end can be suppressed. Further, in the present embodiment, in which Conditional Expression (8) is satisfied, variation in axial chromatic aberration can be suppressed when the magnification is changed.

The projection system 3C then satisfies Conditional Expressions (9) and (10) below, $$5 < D2/t2 < 15 \qquad (9)$$

$$6 < D3/t3 < 15 \qquad (10)$$

In Conditional Expression (9), D2 represents the diameter of a portion of the positive lens (fourth lens L4) of the second lens group LG2 that is the portion where the edge thickness T2 of the fourth lens L4 is 1 mm, and t2 represents the center thickness of the positive lens (fourth lens L4) of the second lens group LG2. In Conditional Expression (10), D3 represents the diameter of a portion of the positive lens (fifth lens L5) of the third lens group LG3 that is the portion where the edge thickness T3 of the fifth lens L5 is 1 mm, and t3 represents the center thickness of the positive lens (fifth lens L5) of the third lens group LG3.

In the present embodiment, D2=38.25 and t2=4.3. Therefore, D2/t2=8.9 is achieved. Further, in the present embodiment, D3=35.65 and t3=4.1. Therefore, D3/t3=8.7 is achieved. In the present embodiment, in which Conditional Expression (9) is satisfied, a situation in which the fourth lens L4 has a large thickness can be avoided. Further, in the present embodiment, in which Conditional Expression (10) is satisfied, a situation in which the fifth lens L5 has a large thickness can be avoided. In the present embodiment, the fourth lens L4 and the fifth lens L5 are made of glass. Therefore, when the fourth lens L4 and the fifth lens L5 each have a small thickness, the manufacturing cost of the lenses is likely to be suppressed.

The projection system 3C satisfies Conditional Expression (11) below, $$1.65 < nd5 < 1.85 \qquad (11)$$

where nd5 represents the refractive index of the negative lens (ninth lens L9) of the fifth lens group LG5.

In the present embodiment, nd5=1.80625. In the present embodiment, in which Conditional Expression (11) is satisfied, occurrence of field curvature can be suppressed. Further, an increase in cost required to manufacture the ninth lens L9 made of glass can be suppressed.

Further, the projection system 3C satisfies Conditional Expression (12) below, $$0.53 < Pg5 < 0.61 \qquad (12)$$

where Pg5 represents the partial dispersion ratio between the g line and the F line dispersed by the negative lens (ninth lens L9) of the fifth lens group LG5.

In the present embodiment, Pg5=0.569. In the present embodiment, in which Conditional Expression (12) is satisfied, occurrence of chromatic aberration of magnification can be suppressed.

The projection system. 3C then satisfies Conditional Expression (13) below, $$0.2<nd61-nd62<0.5 \quad (13)$$

where nd61 represents the refractive index of the magnifying-side negative lens (tenth lens L10) of the second doublet C2, which forms the sixth lens group LG6, at the d line, and nd62 represents the refractive index of the demagnifying-side positive lens (eleventh lens L11) of the second doublet C2 at the d line.

In the present embodiment, nd61=1.69895 and nd62=1.48749. Therefore, nd61−nd62=0.21 is achieved. In the present embodiment, in which Conditional Expression (13) is satisfied, occurrence of field curvature can be suppressed.

The projection system 3C satisfies Conditional Expression (14) below, $$30<vd62-vd61<70 \quad (14)$$

where vd61 represents the Abbe number of the magnifying-side negative lens (tenth lens L10) of the second doublet C2, which forms the sixth lens group LG6, and vd62 represents the Abbe number of the demagnifying-side positive lens (eleventh lens L11) of the second doublet C2.

In the present embodiment, vd61=30.13 and vd62=70.24. Therefore, vd62−vd61=40.11 is achieved. In the present embodiment, in which Conditional Expression (14) is satisfied, occurrence of chromatic aberration of magnification can be suppressed.

The projection system 3C satisfies Conditional Expression (15) below, $$0<nd2-nd3<0.35 \quad (15)$$

where nd2 represents the refractive index of the positive lens (fourth lens L4) of the second lens group LG2 at the d line, and nd3 represents the refractive index of the positive lens (fifth lens L5) of the third lens group LG3 at the d line.

In the present embodiment, nd2=1.80420 and nd3=1.59522. Therefore, nd2−nd3=0.21 is achieved. In the present embodiment, in which Conditional Expression (15) is satisfied, field curvature that occurs when the magnification is changed can be suppressed. Variation in the field curvature at the time of a change in magnification can further be suppressed.

The projection system 3C further satisfies Conditional Expression (16) below, $$|vd2-vd3|<30 \quad (16)$$

where vd2 represents the Abbe number of the positive lens (fourth lens L4) of the second lens group LG2, and vd3 represents the Abbe number of the positive lens (fifth lens L5) of the third lens group LG3.

In the present embodiment, vd2=46.50 and vd3=67.74. Therefore, |vd2−vd3|=21.24 is achieved. In the present embodiment, in which Conditional Expression (16) is satisfied, variation in the chromatic aberration of magnification at the time of a change in magnification can be suppressed.

The first lens L1 of the projection system 3C has an aspheric magnifying-side surface and an aspheric demagnifying-side surface, and the surfaces having the surface numbers S1 and S2 each have the center of paraxial curvature located at the magnifying side. Further, the orientation of the amount of sag changes at a point on each of the surfaces having the surface numbers S1 and S2 of the first lens L1. That is, the amount of change in sag is reversed at a point on each of the surfaces having the surface numbers S1 and S2. The f number can therefore be reduced to a small number. That is, the brightness achieved by the projection system 3C can be readily increased. Further, distortion of the peripheral light and the field curvature can be readily corrected.

The seventh lens group LG7 (thirteenth lens L13) is a positive lens and satisfies Conditional Expression (17) below, $$PgF1>-0.0016 \times vdF1+0.62 \quad (17)$$

where PgF1 represents the partial dispersion ratio between the g line and the F line dispersed by the seventh lens group LG7 (thirteenth lens L13), and vdF1 represents the Abbe number thereof.

In the present embodiment, PgF1=0.543 and vdF1=55.53. Therefore, −0.0016×vdF1+0.62=0.531 is achieved. In the present embodiment, in which Conditional Expression (17) is satisfied, occurrence of chromatic aberration of magnification can be suppressed over the entire range from the wide-angle end to the telescopic end.

Further, in the projection system 3C, out of the negative lenses of the first lens group LG1, the third lens L3 disposed on the demagnifying side has a concave magnifying-side surface and a concave demagnifying-side surface and satisfies Conditional Expression (18) below, $$60<vd13<95 \quad (18)$$

where vd13 is the Abbe number of the third lens L3.

In the present embodiment, vd13=81.55. In the present embodiment, in which Conditional Expression (18) is satisfied, occurrence of chromatic aberration of magnification can be readily suppressed particularly at the telescopic end.

The projection system 3C satisfies Conditional Expression (19) below, $$1.4 \leq BF/fw \leq 2.0 \quad (19)$$

where BF represents the air conversion length of the back focal length at the wide-angle end.

In the present embodiment, BF=29.52 and fw=17.79. Therefore, BF/fw=1.66 is achieved. In the present embodiment, in which Conditional Expression (19) is satisfied, the back focal length is readily ensured with deterioration of the optical performance of the projection system 3C suppressed.

Figure 12:
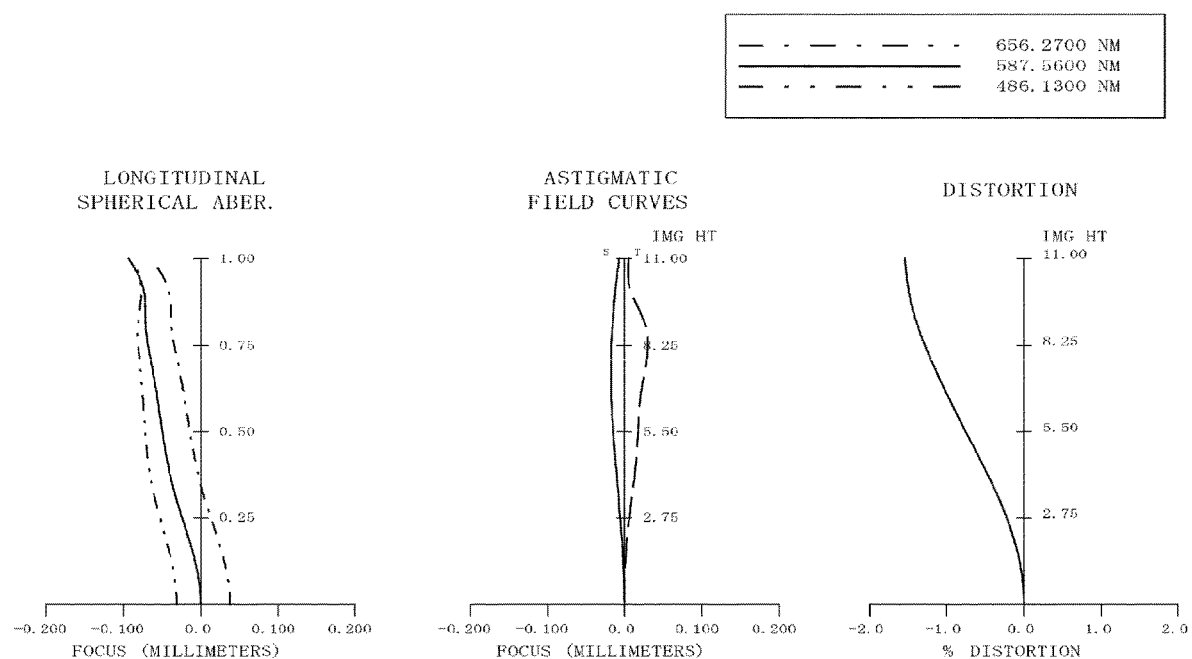
FIG. 12 shows aberrations produced by the projection system according to Embodiment 3 at the wide-angle end.
Figure 13:
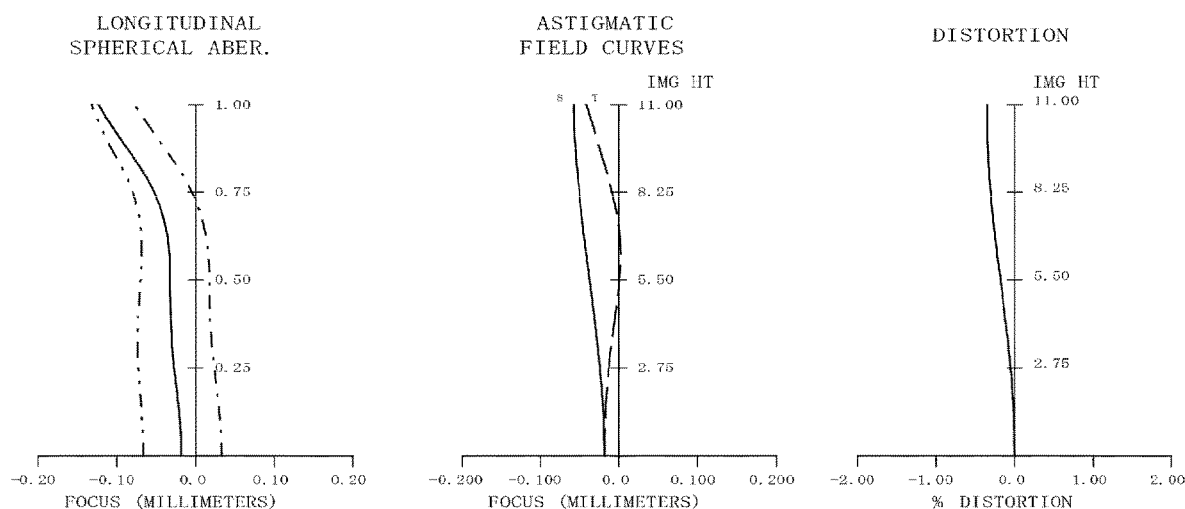
FIG. 13 shows aberrations produced by the projection system according to Embodiment 3 at the telescopic end.

FIG. 12 shows aberrations produced by the projection system 3C at the wide-angle end. FIG. 12 shows the spherical aberration, astigmatism, and distortion. FIG. 13 shows aberrations produced by the projection system 3C at the telescopic end. FIG. 13 shows the spherical aberration, astigmatism, and distortion. In the projection system 3C, the spherical aberration, astigmatism, and distortion are satisfactorily corrected, as shown in FIGS. 12 and 13.

What is claimed is:

1. A projection system having a zooming function that changes projection magnification, the projection system so configured that light rays from a telecentric system enter a lens closest to a demagnifying side and a maximum half field angle at a wide-angle end of the projection system is greater than or equal to 25° but smaller than or equal to 40°, the projection lens comprising a first lens group, a second lens group, a third lens group, a fourth lens group, a fifth lens group, a sixth lens group, and a seventh lens group sequentially arranged from a magnifying side toward the demagnifying side,
wherein the first lens group and the seventh lens group are fixed when the projection magnification is changed,
the second lens group, the third lens group, the fourth lens group, the fifth lens group, and the sixth lens group move along an optical axis when the projection magnification is changed, the second lens group is formed of one positive lens,
the third lens group is formed of one positive lens,
the fourth lens group is formed of one or two positive lenses and one negative lens, the negative lens having a surface facing the magnifying side and a surface facing the demagnifying side with each of the surfaces having a center of curvature located at the magnifying side,
the fifth lens group is formed of one negative lens having an aspheric surface facing the magnifying side and an aspheric surface facing the demagnifying side with each of the surfaces having a center of curvature located at the demagnifying side,
the projection system satisfies Conditional Expressions (1) to (8) below, $$1.2<|f1/fw|<1.5 \tag{1},$$

$$1.4 \leq ft/fw \leq 1.8 \tag{2},$$

$$1.4 \leq FNw \leq 1.8 \tag{3},$$

$$1.05<FNt/FNw<1.25 \tag{4},$$

$$1.5<|f5/fw|<3.5 \tag{5},$$

$$1.75<nd2<2.0 \tag{6},$$

$$0.2<nd42-nd41<0.5 \tag{7, and}$$

$$20<v41-v42<70 \tag{8},$$

where ω represents a maximum half field angle at the wide-angle end, fw represents a focal length of the entire optical system at the wide-angle end, ft represents a focal length of the entire optical system at a telescopic end, f1 represents a focal length of the first lens group, f5 represents a focal length of the fifth lens group, FNw represents FNO at the wide-angle end, FNt represents FNO at the telescopic end, nd2 represents a refractive index of the positive lens of the second lens group, nd41 and v41 represent a refractive index and an Abbe number of a positive lens closest to the magnifying side in the fourth lens group, respectively, and nd42 represents a refractive index of the negative lens of the fourth lens group, and v42 is an Abbe number of the negative lens of the fourth lens group, and
the projection system is formed of 13 lenses or fewer.

2. The projection system according to claim 1,
wherein the projection system satisfies Conditional Expressions (9) and (10) below, $$5<D2/t2<15 \tag{9, and}$$

$$6<D3/t3<15 \tag{10},$$

where D2 represents a diameter of a portion of the positive lens of the second lens group that is a portion where an edge thickness of the positive lens is 1 mm, t2 represents a center thickness of the positive lens of the second lens group, D3 represents a diameter of a portion of the positive lens of the third lens group that is a portion where an edge thickness of the positive lens is 1 mm, and t3 represents a center thickness of the positive lens of the third lens group.

3. The projection system according to claim 1,
wherein the projection system satisfies Conditional Expressions (11) and (12) below, $$1.65<nd5<1.85 \tag{11, and}$$

$$0.53<Pg5<0.61 \tag{12},$$

where nd5 represents a refractive index of the negative lens of the fifth lens group, and Pg5 represents a partial dispersion ratio between a g line and an F line dispersed by the negative lens of the fifth lens group LG5.

4. The projection system according to claim 1,
wherein the sixth lens group includes one doublet,
the doublet is formed of a negative lens and a positive lens sequentially arranged from the magnifying side toward the demagnifying side, and
the projection system satisfies Conditional Expressions (13) and (14) below, $$0.2<nd61-nd62<0.5 \tag{13, and}$$

$$30<vd62-vd61<70 \tag{14},$$

where nd61 represents a refractive index of the negative lens of the doublet at a d line, vd61 represents an Abbe number of the negative lens of the doublet, nd62 represents a refractive index of the positive lens of the doublet at the d line, and vd62 represents an Abbe number of the positive lens of the doublet.

5. The projection system according to claim 1,
wherein the projection system satisfies Conditional Expressions (15) and (16) below, $$0<nd2-nd3<0.35 \tag{15, and}$$

$$|vd2-vd3|<30 \tag{16},$$

where nd2 represents a refractive index of the positive lens of the second lens group at a d line, vd2 represents an Abbe number of the positive lens of the second lens group, nd3 represents a refractive index of the positive lens of the third lens group at the d line, and vd3 represents an Abbe number of the positive lens of the third lens group.

6. The projection system according to claim 1,
wherein a first lens closest to the magnifying side in the first lens group has an aspheric surface facing the magnifying side and an aspheric surface facing the demagnifying side, the aspheric surfaces each having a center of paraxial curvature located at the magnifying side, and orientation of an amount of sag changes at a point on each of the aspheric surfaces.

7. The projection system according to claim 1,
wherein the seventh lens group is formed of one positive lens and satisfies Conditional Expression (17) below, $$PgF1>-0.0016 \times vdF1+0.62 \tag{17}$$

where PgF1 represents a partial dispersion ratio between a g line and an F line dispersed by the positive lens of the seventh lens group, and vdF1 represents an Abbe number of the positive lens of the seventh lens group.

8. The projection system according to claim 1,
wherein the first lens group includes at least two negative lenses, and
out of the negative lenses provided in the first lens group, a demagnifying-side negative lens closest to the demagnifying side has a concave surface facing the magnifying side and a concave surface facing the demagnifying side and satisfies Conditional Expression (18) below, $$60<vd13<95 \tag{18}$$

where vd13 is an Abbe number of the demagnifying-side negative lens.

9. The projection system according to claim 1,
wherein the projection system satisfies Conditional Expression (19) below, $$1.4 \leq BF/fw \leq 2.0 \tag{19}$$

where BF represents an air conversion length of a back focal length of the projection system at the wide-angle end.

10. A projection-type image display apparatus comprising:
the projection system according to claim 1; and
an image display device disposed at a demagnifying-side conjugate plane of the projection system.

11. A projection-type image display apparatus comprising:
the projection system according to claim 2; and
an image display device disposed at a demagnifying-side conjugate plane of the projection system.

12. A projection-type image display apparatus comprising:
the projection system according to claim 3; and
an image display device disposed at a demagnifying-side conjugate plane of the projection system.

13. A projection-type image display apparatus comprising:
the projection system according to claim 4; and
an image display device disposed at a demagnifying-side conjugate plane of the projection system.

14. A projection-type image display apparatus comprising:
the projection system according to claim 5; and
an image display device disposed at a demagnifying-side conjugate plane of the projection system.

15. A projection-type image display apparatus comprising:
the projection system according to claim 6; and
an image display device disposed at a demagnifying-side conjugate plane of the projection system.

16. A projection-type image display apparatus comprising:
the projection system according to claim 7; and
an image display device disposed at a demagnifying-side conjugate plane of the projection system.

17. A projection-type image display apparatus comprising:
the projection system according to claim 8; and
an image display device disposed at a demagnifying-side conjugate plane of the projection system.

18. A projection-type image display apparatus comprising:
the projection system according to claim 9; and
an image display device disposed at a demagnifying-side conjugate plane of the projection system.

* * * * *